US011385625B2

(12) United States Patent
Itou et al.

(10) Patent No.: US 11,385,625 B2
(45) Date of Patent: Jul. 12, 2022

(54) FLOW CONTROL SYSTEM AND CONTROL METHOD THEREFOR

(71) Applicant: NEC Corporation, Tokyo (JP)

(72) Inventors: Takehiro Itou, Tokyo (JP); Nobuharu Kami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 421 days.

(21) Appl. No.: 16/496,999

(22) PCT Filed: Mar. 30, 2017

(86) PCT No.: PCT/JP2017/013369
§ 371 (c)(1),
(2) Date: Sep. 24, 2019

(87) PCT Pub. No.: WO2018/179273
PCT Pub. Date: Oct. 4, 2018

(65) Prior Publication Data
US 2020/0096977 A1    Mar. 26, 2020

(51) Int. Cl.
*G05B 19/418* (2006.01)
*G08G 1/01* (2006.01)
(52) U.S. Cl.
CPC ........... *G05B 19/41865* (2013.01); *G05B 2219/37371* (2013.01); *G08G 1/0116* (2013.01); *G08G 1/0145* (2013.01)
(58) Field of Classification Search
CPC .... G05B 19/41865; G05B 2219/37371; G05B 2219/32304; G08G 1/0116; G08G 1/0145; G08G 1/081; Y02P 90/02; G06Q 10/06
See application file for complete search history.

(56) References Cited

U.S. PATENT DOCUMENTS

| 5,993,041 A | 11/1999 | Toba |
| 2007/0168067 A1 | 7/2007 | Yaji et al. |
| 2017/0050379 A1* | 2/2017 | Houben ................ B33Y 40/00 |

FOREIGN PATENT DOCUMENTS

| JP | 02-29801 A | 1/1990 |
| JP | 02-236604 A | 9/1990 |

(Continued)

OTHER PUBLICATIONS

K. Konishi, "A tuning strategy to avoid blocking and starving in a buffered production line", European Journal of Operational Research, vol. 200, pp. 616-620, 2010, 5 pages total.

(Continued)

*Primary Examiner* — James J Lee
*Assistant Examiner* — Shon G Foley
(74) *Attorney, Agent, or Firm* — Sughrue Mion, PLLC

(57) ABSTRACT

This flow control system is obtained by connecting a plurality of work units WUα and a plurality of work units WUβ to one another, wherein: each WUα has an α-control purpose which is a WU-based independent control purpose, and has an α-control rule for the α-control purpose; each WUβ has a β-control purpose to cause as many WUα as possible to achieve the own α-control purposes, and has a β-control rule for the β-control purpose; the β-control rule is dynamically changed on the basis of partial information about the flow control system; and the WUβ is disposed in a part of the flow control system.

18 Claims, 15 Drawing Sheets

(56) References Cited

FOREIGN PATENT DOCUMENTS

| JP | 10-161708 A | 6/1998 |
|---|---|---|
| JP | 2004-348370 A | 12/2004 |
| JP | 2007-206877 A | 8/2007 |
| JP | 2007-293689 A | 11/2007 |
| JP | 2016-091249 A | 5/2016 |
| WO | 2005/062145 A1 | 7/2005 |
| WO | 2014/002319 A1 | 1/2014 |

OTHER PUBLICATIONS

International Search Report dated Jun. 20, 2017 issued by the International Searching Authority in International Application No. PCT/JP2017/013369.
Written Opinion dated Jun. 20, 2017 issued by the International Searching Authority in International Application No. PCT/JP2017/013369.
Japanese Office Action for JP Application No. 2019-508053 dated May 11, 2021 with English Translation.

* cited by examiner

FLOW CONTROL SYSTEM AND CONTROL METHOD THEREFOR

This application is a National Stage Entry of PCT/JP2017/013369 filed on Mar. 30, 2017, the contents of all of which are incorporated herein by reference, in their entirety.

TECHNICAL FIELD

This invention relates to a flow control system and a control method therefor.

BACKGROUND ART

In production management systems, traffic control systems, and logistics control systems, control is performed in each step, each area, and the like so that the overall flow proceeds with efficiency.

A production management system that executes a plurality of steps, for example, is required to adjust processing in each step while fulfilling a certain production goal. A production line in general executes a series of steps, and an article processed in one step is conveyed to the next step. In the next step, work on the article is immediately started when the capacity available at the destination of the conveyance is high enough to execute the step. When the capacity available at the destination of the conveyance is not high enough to execute the step, on the other hand, the conveyed article is placed in wait for processing as an article waiting to be worked on. A general production line is provided with a storage shelf, namely, buffer, of varying size for each step in order to store waiting articles.

FIG. 1 is a schematic diagram for illustrating an example of a production management system. The constituent unit of management handled by this production management system is one cohesive processing step, and is denoted by 10a or 10b in FIG. 1. The processing step 10a involves processing equipment 3a configured to execute processing, a buffer 2a configured to temporarily store a processed article, and an information obtaining device 1a configured to obtain information about the buffer 2a. The processing step 10b involves similar equipment. A buffer in general has a limited capacity. The production management system is therefore required to manage the amount of work in progress to avoid exceeding the buffer capacity in every processing step. When a processing step in a series of processing steps is processed as fast as possible just because the available capacity is more than high enough to execute the current processing step, the buffer overflows in the next processing step. With the buffer overflowing in the next processing step, articles can no longer be conveyed beyond the current processing step, and persistence of this state eventually brings processing at the current processing step to a halt.

Articles from the preceding processing step accordingly start to accumulate in the buffer for the current processing step as well, and buffer overflow spreads upstream along the flow of processing steps. Once buffer overflow happens, the capacity to process processing steps is also affected in many cases due to limitations in physical space and other aspects. To avoid such a situation that may be called backlog congestion, the progress of work is required to be managed in each processing step.

Similarly, when no new articles from the preceding step arrive and the buffer is empty, the processing of the current processing step cannot be started and the processing step waits for the arrival of articles to be processed. Persistence of this phenomenon causes the buffer for the next processing step to empty, and the phenomenon spreads downstream along the flow of processing steps. This state is inefficient from the viewpoint of capacity utilization rate, and is therefore to be avoided as well. A situation in which the buffered quantity is large all the time is also undesirable from the viewpoint of inventory management, and is therefore to be avoided.

What is demanded of process management is to adjust the throughput in each processing step so that excessive accumulation in a buffer is prevented as much as possible while fulfilling a production goal.

Examples of a control system aimed to maximize the flow efficiency in such a system that has a buffer for each of a series of processing steps in certain processing include a traffic control system for traffic light control or other uses, a supply chain management system for a supply chain from a production plant to a wholesale warehouse and to a retail shop, and a vehicle allocation management system in the commodity distribution and delivery industry. Those systems have three characteristics: (1) each component (each processing step, each vehicle, or each business) or the like is capable of operating autonomously to some degree, (2) in overall view, many elements are involved in processing, which makes the systems complex due to a difficulty of prediction and a high level of uncertainty, and (3) the complexity and the autonomy pose a difficulty in gathering all pieces of information.

The invention disclosed in Patent Document 1 can be given as an example of a control method for use in a complex system. In the invention disclosed in Patent Document 1, a system is built to have three hierarchical layers, namely, a top layer, an intermediate layer, and a bottom layer, and cooperation between sub-systems on the same hierarchical layer is implemented by a sub-system on one hierarchical layer above. This breaks processing to be executed by the complex system into segments, and lightens the load of each processing segment, thereby accomplishing control.

In Patent Document 2, there is disclosed a method of managing a buffer of a production system. As the method of Patent Document 2, there is proposed a method in which the start of work in each equipment group is managed to keep to a limit imposed on the buffer capacity in each step. In this method, the length of work time required when work on a lot present in a buffer is to begin immediately is predicted for each of equipment groups that have finite buffers and that are successive to one another in terms of the sequence of steps, in the order of the series of steps, in light of the current and future situations of equipment belonging to the equipment groups and the buffers in successive blocks, which are managed by a work start controller and a scheduler. After it is confirmed that wait for the start of work is expected in none of the equipment groups in the successive blocks when work on the lot is to be started immediately, work on the lot is started based on the predicted lengths of work time.

Patent Document 3 is one of technologies aimed to control the production quantity of a production line. In Patent Document 3, there is proposed controlling a production line by modeling a production line with the use of a state space model, designing a state feedback, and performing simulation through optimum control.

A method disclosed in Patent Document 4 is given as an example of autonomous decentralization of a production system. In the method of Patent Document 4, a so-called free flow line system, which executes a plurality of steps, and includes a conveyance device configured to move an article between steps, stores various types of information about the article being conveyed in an information recording medium provided in the article being conveyed. The information stored in the information recording medium is read in each step to determine what processing is to be performed on the article being conveyed. This method thus accomplishes autonomous operation in each step, and operation in each step can be executed without an instruction from a central device or other central components.

Non Patent Document 1 takes another approach in which a production line is modeled by a differential equation, and a control parameter that causes no buffer overflow and no buffer starvation is obtained for each step with the use of an H∞ norm (H-infinity norm) of a transfer function of a control system. In Non Patent Document 1, it is described that it is not always required to adjust parameters in all steps, and that buffer overflow and buffer starvation are avoidable by adjusting parameters only in a limited number of steps.

In each of Patent Document 5 and Patent Document 6, there is proposed a method related to traffic light control, which is flow control in a two-dimensional grid. In the method, a decentralized control device is introduced for each traffic light, and the decentralized control device obtains a control parameter of a traffic light adjacent to its own traffic light to control the timing of lighting (switching) its own traffic light by taking the adjacency relationship into consideration.

PRIOR ART DOCUMENT(S)

Patent Document(s)

Patent Document 1: JP 1990-29801 A
Patent Document 2: JP 1998-161708 A
Patent Document 3: JP 2007-206877 A
Patent Document 4: JP H2-236604 A
Patent Document 5: JP 2004-348370 A
Patent Document 6: JP 2016-91249 A Non Patent Document(s)

Non Patent Document 1: Konishi, Keiji. "A tuning strategy to avoid blocking and starving in a buffered production line" European journal of operational research 200.2 (2010): 616-620.

SUMMARY OF THE INVENTION

Problem to be Solved by the Invention

However, the control technologies described above have problems given below.

In the method of Patent Document 1, processing is executed in each hierarchical layer based on information from basically all elements, and statistical information thereof is handled in a layer above the hierarchical layer. The method of Patent Document 1, however, requires the installation of a device dedicated to obtaining of information in order to ensure that information of each element is obtained in each hierarchical layer. Application of this method to a production line or a traffic system accordingly means a high introduction cost due to the obtaining of information from all dispersed elements.

Patent Document 2 and Patent Document 3 each require information of the overall system, and accordingly have a difficulty in stabilizing in a situation of high uncertainty created by, for example, the lack of information about a part of the system. In each of Patent Document 2 and Patent Document 3, centralized control is used, and hence it is difficult to perform calculation in actual time in a large-scale, complex line.

Patent Document 4, which uses autonomous decentralization, also requires overall automation of the system, and has a resultant problem in that the introduction cost is very high. Patent Document 4 also has a difficulty in controlling the flow efficiently because information about equipment efficiency, information about an adjacent step, and the like are not handled in the method of Patent Document 4.

Patent Document 5 and Patent Document 6 are also suspected to incur a very high introduction cost because sophisticated decentralized control is performed on basically all traffic lights that are to be controlled.

In Non Patent Document 1, it is described that the overall efficiency of the system can be improved also by adjusting parameters of only specific steps in the system with the use of an H∞ norm. However, this is nothing but designing to ensure that no problem arises from the worst input or the worst disturbance by estimating the worst input value and the worst disturbance value at the design stage. For instance, the parameter in Non Patent Document 1 is a parameter for determining how closely the buffered quantity of the preceding step is to be followed. To keep this parameter high is to follow a goal value closely at all times. A control cost is generally increased by maintaining high followability. Accordingly, the method of Non Patent Document 1, which gives a fixed parameter at the time of design, has a problem of incurring a redundant control cost in normal operation, for which the capability to follow a goal value is not particularly required.

In consideration of the problems described above, a flow control system that is demanded is a decentralized control system that accomplishes as low an introduction cost as possible even in a highly uncertain situation and a low control cost in normal operation.

This invention has been made in view of the problems described above, and has an object to provide a flow control system and a control method for use in the flow control system, in which the overall efficiency of a system is controlled at a reduced introduction cost and a reduced control cost without requiring the gathering of all pieces of information even when the system is complex due to a difficulty of prediction and a high level of uncertainty.

Means to Solve the Problem

According to a first aspect of this invention, there is provided a flow control system, comprising:
a plurality of work units α (hereinafter abbreviated as WUα's); and
a plurality of work units β (hereinafter abbreviated as WUβ's), the plurality of WUβ's and the plurality of WUα's being linked,
wherein each of the plurality of WUα's has an α control objective, which is a control objective set for each WU independently, and an α control rule, which is a control rule to be applied to the α control objective,
wherein each of the plurality of WUβ's has a β control objective, which is an aim to enable many WUα's out of the plurality of WUα's to achieve their respective α control objectives, and a β control rule, which is a control rule to be applied to the β control objective,
wherein the β control rule is a control rule dynamically changed based on partial information of the flow control system, and wherein the plurality of WUβ's are placed in some areas of the flow control system.

According to a second aspect of this invention, there is provided a control method for a flow control system, comprising a plurality of work units α (hereinafter abbreviated as WUα's); and a plurality of work units β (hereinafter abbreviated as WUβ's), the plurality of WUβ's and the plurality of WUα's being linked, wherein each of the plurality of WUα's has an α control objective, which is a control objective set for each WU independently, and an α control rule, which is a control rule to be applied to the α control objective, wherein each of the plurality of WUβ's has a β control objective, which is an aim to enable many WUα's out of the plurality of WUα's to achieve their respective α control objectives, and a β control rule, which is a control rule to be applied to the β control objective, wherein the β control rule is a control rule dynamically changed based on partial information of the flow control system, and wherein the plurality of WUβ's are placed in some areas of the flow control system, wherein each of the plurality of WUα's at least handles a processing step, which is a control target, wherein the processing step involves at least a buffer and processing adjustable in speed, and wherein the WU is operable:
  to obtain processing step information from the processing step of the own WUα; and
  to control the processing step based on the obtained processing step information of the own WUα.

wherein each of the plurality of WUβ's at least handles a processing step, which is a control target, wherein the processing step involves at least a buffer and processing adjustable in speed, and wherein the WUβ is operable:
  to obtain processing step information of the own WUβ from the processing step of the own WUβ;
  to obtain peripheral processing step information from other work units, WUα's or WUβ's, that are near the WUβ, and integrate the obtained peripheral processing step information and the obtained processing step information of the own WUβ; and
  to control the processing step based on the integrated processing step information.

Effect of the Invention

According to this invention, there is realized a flow control system that accomplishes a low introduction cost even in a highly uncertain situation and a low control cost in normal operation in a system that is a flow of successive steps.

MODES FOR EMBODYING THE INVENTION

First Embodiment

A configuration and operation implemented when this invention is applied to management of processing step equipment groups in a production process will be described as a first embodiment of this invention.

[Description of the Configuration]

Figure 2:
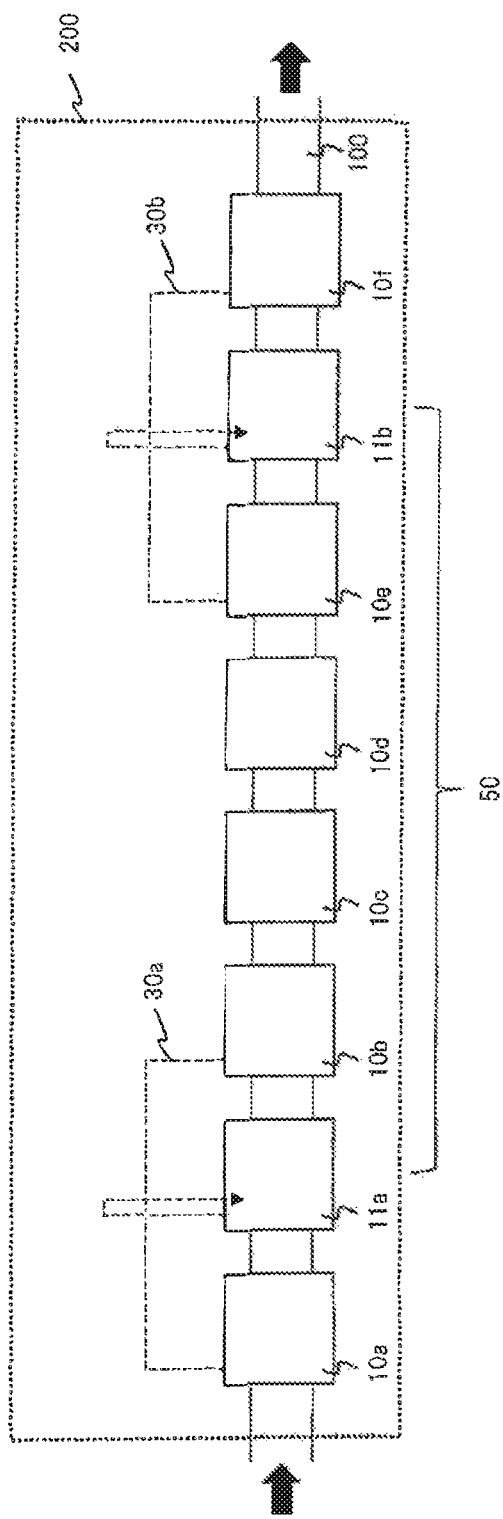
FIG. 2 is a schematic diagram for illustrating a configuration example of a flow control system according to a first embodiment of this invention.

FIG. 2 is a diagram for illustrating an overall configuration example of a flow control system 200 according to the first embodiment in an example of a production process to which this invention is applied. In FIG. 2, the flow control system 200 includes a plurality of work units α (hereinafter abbreviated as "WUα's"), 10a to 10f, and a plurality of work units β (hereinafter abbreviated as "WUβ's"), 11a and 11b. No particular meaning is rendered to the symbols α and β, and the WUα's and the WUβ's may be referred to as "first WU's" and "second WU's", respectively. The same applies to "α control objective", "α control rule", "β control objective", and "β control rule", which are described later, and the control objectives and the control rules may be referred to as "first control objective", "first control rule", "second control objective", and "second control rule", respectively. In the following description, the suffixes a, b, and others may be omitted unless particularly noted, and the work units may be denoted as "WUα's 10" and "WUβ's 11". Each of WUα's 10 and WUβ's 11 serves as a constituent unit of the production process. The WU's are linked by a work line 100, and a production article is produced along the work line 100 through processing at the respective WU's. In this case, the WUβ's 11 are placed in some areas along the work line 100 in accordance with a predetermined distribution 50.

Figure 1:
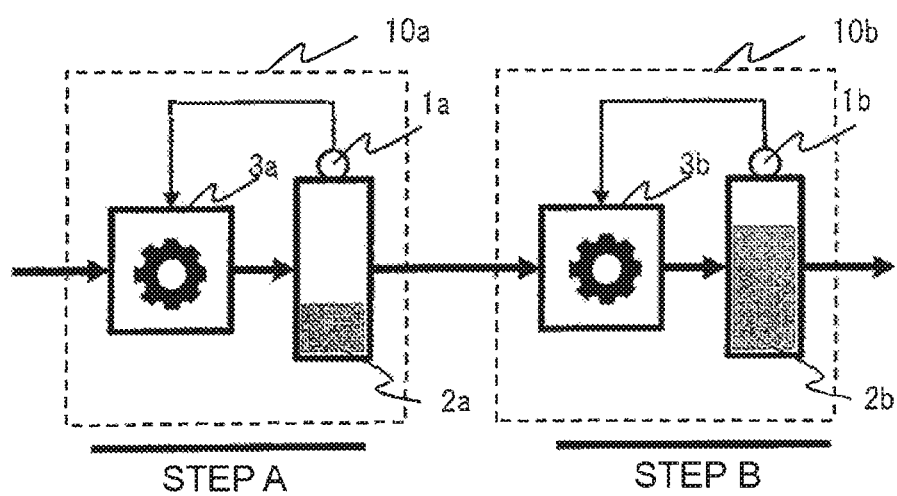
FIG. 1 is a schematic diagram for illustrating a configuration example of a production management system as an example of a flow control system to which this invention may be applied.
Figure 3:
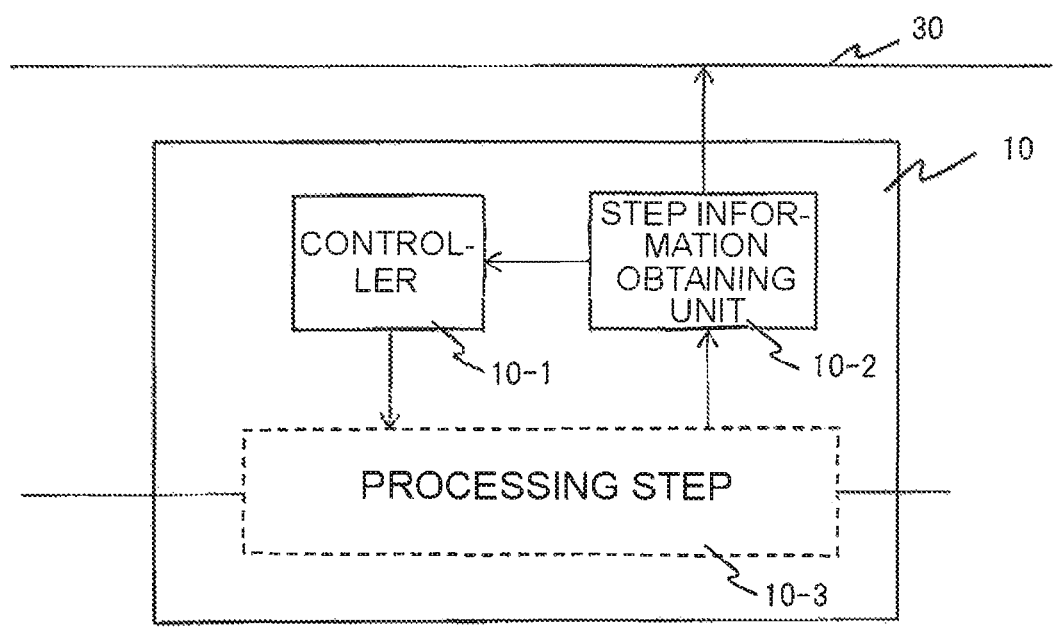
FIG. 3 is a block diagram for illustrating a configuration example of a WUα in the first embodiment of this invention.

FIG. 3 is a block diagram for illustrating a configuration example and operation of each WUα 10. The WUα 10 handles a processing step 10-3, and includes at least a step information obtaining unit 10-2, which obtains processing step information, and a controller 10-1, which controls the processing step. The WUα 10 includes, other than those components, a storage to store various types of information. However, the storage may be implemented by an external storage device instead of being built in the WUα 10, and therefore is omitted from the drawing. The same applies to each WUβ, which is described later. The processing step 10-3 is, for example, a speed adjustable step in which a product is processed by processing equipment 3a illustrated in FIG. 1, and placed in a buffer 2a. In the first embodiment, the processing step 10-3 and the processing step of its adjacent WUα 10 or WUβ 11 are assumed to be successive to one another in terms of process, and an article in the buffer 2a for a step A in FIG. 1, for example, is processed by equipment 3b in a step B, which is the next step. The processing step information is information about the progress and state of the processing step, and is, for example, the buffered quantity and the processing speed of the step equipment in the processing step in the first embodiment. Whether the buffered quantity is to be increased or decreased is determined by a difference in the processing speed of the equipment between the preceding step and the next step. For example, changes in the buffered quantity of one WUα are expressed by a differential equation such as Expression (1).

The premise here is that N WUα's 10 are successive to one another along the work line 100 in the first embodiment.

The WUα 10 at the farthest point downstream in the flow of products, namely, an exit of the work line, is the 0-th WUα 10, and the WUα 10 at the farthest point upstream is the N-th WUα 10.

[Math. 1]

$$\frac{dx_i(t)}{dt} = v_i(t) - v_{i-1}(t) \quad (1)$$

[Math. 2]

$$\frac{dx_0(t)}{dt} = v_0(t) - r(t) \quad (2)$$

In the expressions, a variable xi(t) is a variable indicating a margin capacity to the full buffer capacity of an i-th WU.

Expression (2) indicates that, when a certain speed is set as a goal product shipping speed r(t), the output of the 0-th WU is affected by a change in r(t).

A variable vi(t) is a variable indicating the processing speed of processing equipment in the processing step of the i-th WU.

In the following description, one WUα that is counted as the i-th WUα is denoted as "WUα 10_i". That is, the WU at the exit for products is denoted as "WUα 10_0" and the WU at the farthest point upstream is denoted as "WUα 10_N".

Expression (1) indicates that, in the i-th WUα 10_i, when a processing step speed vi−1(t) of the (i−1)-th WUα 10_i−1 in the next step is higher than the processing step speed vi(t) of its own step, the buffered quantity decreases by a quantity that corresponds to the difference between the processing step speeds, while the buffered quantity increases when the speed vi−1(t) is lower than vi(t).

The step information obtaining unit 10-2 obtains the processing step information via, for example, various sensors of equipment used in the processing step.

The controller 10-1 uses the step information obtained by the step information obtaining unit 10-2 to control the processing step so that an α control objective set to each WUα is fulfilled.

In the first embodiment, the α control objective of a step is, for example, to avoid buffer overflow or buffer starvation in the step. Control of a processing step is, for example, an adjustment of the processing speed of equipment in the processing step. More specifically, the processing speed is adjusted to avoid buffer overflow and buffer starvation by decreasing the processing speed as the buffered quantity approaches the full buffer capacity, and increasing the processing speed when, conversely, the buffered quantity is nearly zero. A rule by which control is performed to achieve an objective in this manner is hereinafter referred to as "control rule". The control rule in the first embodiment is expressed, for example, by a differential equation given below.

[Math. 3]

$$\frac{dv_i(t)}{dt} = k_i \left\{ \frac{V_i}{h_i} x_i(t) - v_i(t) \right\} \quad (3)$$

In the expression, a constant Vi is a constant indicating a maximum value that is taken by the processing speed of processing equipment in the i-th WU, a constant hi is a constant indicating the full buffer capacity of the i-th WU, and a constant ki is a processing speed adjustment coefficient to be applied to a control amount by which processing equipment of the i-th WU is controlled.

Expression (3), which expresses the control rule, indicates that, in the WUα 10_i, the processing speed vi of each piece of equipment is adjustable, and that the processing speed is to be decreased as the buffered quantity of its own step approaches the full buffer capacity and is to be increased when, conversely, the buffered quantity is nearly zero. A limit value of the processing speed is determined by Vi, and a coefficient for the level of responsiveness of speed change to a difference in buffered quantity is determined by k.

The prevention of buffer overflow and buffer starvation in each WU along the work line 100 is considered. The coefficient ki is designed to have a value that causes no buffer violation throughout the work line by, for example, obtaining a transfer function with respect to r(t). For example, it is sufficient that the range of perturbation in one WUα 10_i does not reach an upper limit (hi) or a lower limit (0) with respect to the range of perturbation of r(t). That is, the value of ki in one WUα 10_i can be determined based on whether a gain of the transfer function fulfills a certain standard. In order to design the gain for any frequency, appropriate ki can be designed for each frequency with the use of, for example, an H∞ norm of the transfer function. However, to set appropriate ki to every WU is nothing but to introduce adjustable equipment to every WU, which incurs an excessive equipment investment cost.

The method of setting ki based on the transfer function is employable also when only some WU's are adjustable. However, the use of the H∞ norm is equal to estimating the worst value for a certain matter and estimating whether the standard is fulfilled even at the worst value. In other words, the use of the H∞ norm is equal to fixing the WU to a parameter that has no risk of causing a problem even at the worst value and always using the fixed parameter when running. In the first embodiment, this corresponds to, for example, equipment operating to follow the slightest perturbation very quickly. It can therefore be said that operating with the use of a fixed parameter based on the worst value is wasteful when control efficiency including the one in normal operation is considered.

Accordingly, in the first embodiment of this invention, only some WU's are made adjustable at first, and parameters of the adjustable WU's are dynamically changed.

The WU's that have adjustable parameters are the WUβ's 11. A specific configuration of each WUβ is described later. The qualitative operation of each WUβ is described first.

Each WUβ 11 controls whether to change a control parameter, based on information of nearby WUα's. Specifically, the WUβ 11 obtains, for example, a local transfer function from the processing step information provided by a plurality of nearby WUα's 10 and, when a gain of the transfer function is expected to exceed the standard, changes a parameter $k\beta$ in the control rule (Expression 3) of its own step.

This operation is an act of changing the processing speed adjustment coefficient $k\beta$ of equipment in its own step, but the change of $k\beta$ changes transfer functions of a certain range of WU's including this WUβ. Gains of the transfer functions in the range are suppressed by appropriately designing $k\beta$. This means that an adjustment to avoid buffer overflow and buffer starvation in the range of WUα's is accomplished by adjusting $k\beta$.

A maximum value $k\beta max$ of the parameter $k\beta$, which can be set to a value dependent on the specifications of equipment of the WUβ, is normally limited. This means that, when one WUβ is placed at a specific position in the system, the number of hops from another WUβ at which a transfer function fulfilling a certain standard can be attained (the number of WU's interposed between one WUβ and the next WUβ) is limited by $k\beta max$.

In other words, a range in the system in which a transfer function fulfilling a certain standard can be attained can be calculated from the maximum parameter value $k\beta max$ of the WUβ, and how many WU's are to be placed between one WUβ and another WUβ along the work line can accordingly be calculated as well when there is a predetermined range of perturbation of a production goal for the work line 100.

The specific configuration of each WUβ is described below.

In FIG. 2, the WUβ's are arranged along the work line 100 in accordance with the predetermined distribution 50. In the first embodiment, a distribution that enables the system to fulfill a standard for gains throughout the system is determined as the distribution 50 in advance based on, for example, transfer functions in the system.

In the first embodiment, the WUβ's are linked to nearby WUα's by a network 30, through which the WUβ's can obtain the processing step information from the nearby WUα's. It is not required in the first embodiment to set ranges of nearby WU's so that all ranges of nearby WU's joined together cover the entire work line. For instance, none of WUβ's along the one-dimensional work line in FIG. 2 obtains the processing step information from WUα 10c and WUα 10d.

Figure 4:
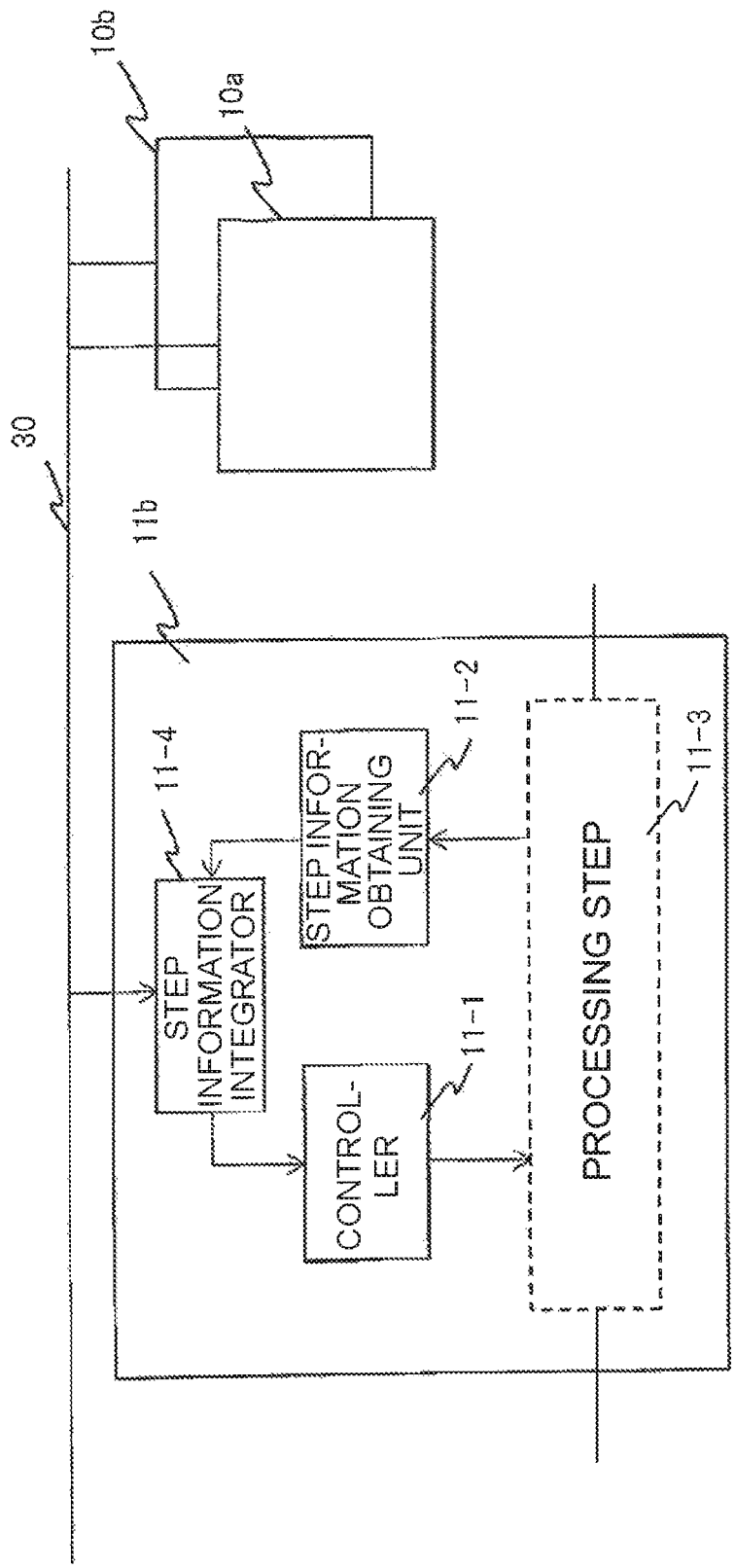
FIG. 4 is a block diagram for illustrating a configuration example of a WUβ in the first embodiment of this invention.

FIG. 4 is a block diagram for illustrating a configuration example and operation of each WUβ 11. In FIG. 4, the WUβ 11 handles a processing step 11-3, and includes at least a step information obtaining unit 11-2 and a step information integrator 11-4. The definitions of the processing step 11-3 and the step information obtaining unit 11-2 are the same as the definitions of the processing step 10-3 and the step information obtaining unit 10-2 in the WUα described with reference to FIG. 3, and descriptions thereof are therefore omitted. The step information integrator 11-4 in the first embodiment is connected to one or more nearby WUα's 10 by the network 30 to obtain the processing step information of each nearby WUα 10, and integrates the processing step information of the WUα 10 with the processing step information obtained by the step information obtaining unit 11-2 of its own step.

A controller 11-1 uses the integrated information obtained in the step information integrator 11-4 to control the processing step 11-3 so that a β control objective is achieved. In this case, the β control objective is to achieve the α control objective in as many WUα's and WUβ's as possible. In the first embodiment, this translates into controlling the processing step 11-3 of the WUβ so that buffer overflow and buffer starvation are prevented in the processing steps of as many WUα's 10 as possible throughout the system in addition to preventing buffer overflow and buffer starvation in its own processing step.

[Description of the Operation]

The operation is described with the use of a specific example. In the first embodiment, N WU's are assumed to be successive to one another along the work line 100. The WU at the farthest point downstream in the flow of products, namely, an exit of the work line, is the 0-th WU, and the WU at the farthest point upstream is the N-th WU. In the following description, the i-th WUα is denoted as "WUα 10_i". Accordingly, the WUα at the exit for products is denoted as "WUα 10_0" and the WUα at the farthest point upstream is denoted as "WUα 10_N".

Figure 5:
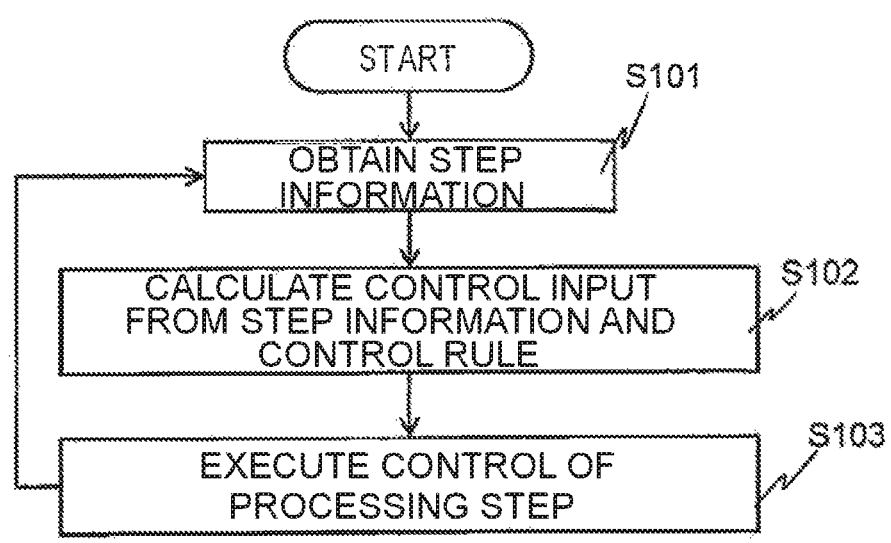
FIG. 5 is a flow chart for illustrating the operation of the WUα in the first embodiment of this invention.

FIG. 5 is a flow chart for illustrating the operation of one WUα 10_i. The processing sequence illustrated in FIG. 5 is merely an example. The processing sequence may be rearranged without changing the action and effects as long as the anteroposterior relation between processing steps illustrated in FIG. 5 is consistent.

The WUα 10_i starts the operation and first obtains the processing step information as processing in the step information obtaining unit 10-2 (Step S101).

In the first embodiment, the processing step information in one WUα 10_i is the buffered quantity and the processing speed of equipment in the processing step, and the obtained buffered quantity value and the obtained processing speed of the equipment are expressed as xi(t) and vi(t), respectively.

Next, a control variable of processing step control is calculated from the obtained processing step information and the control rule as the operation of the controller 10-1.

In the first embodiment, a change amount dvi/dt of the processing speed of the equipment in WUα 10_i is determined by, for example, Expression (2) described above (Step S102). A control input is applied next to the equipment in the processing step based on the obtained change amount of the processing speed (Step S103). The WUα performs control to prevent its own buffer from overflowing by repeating Steps S101 to S103 described above.

Figure 6:
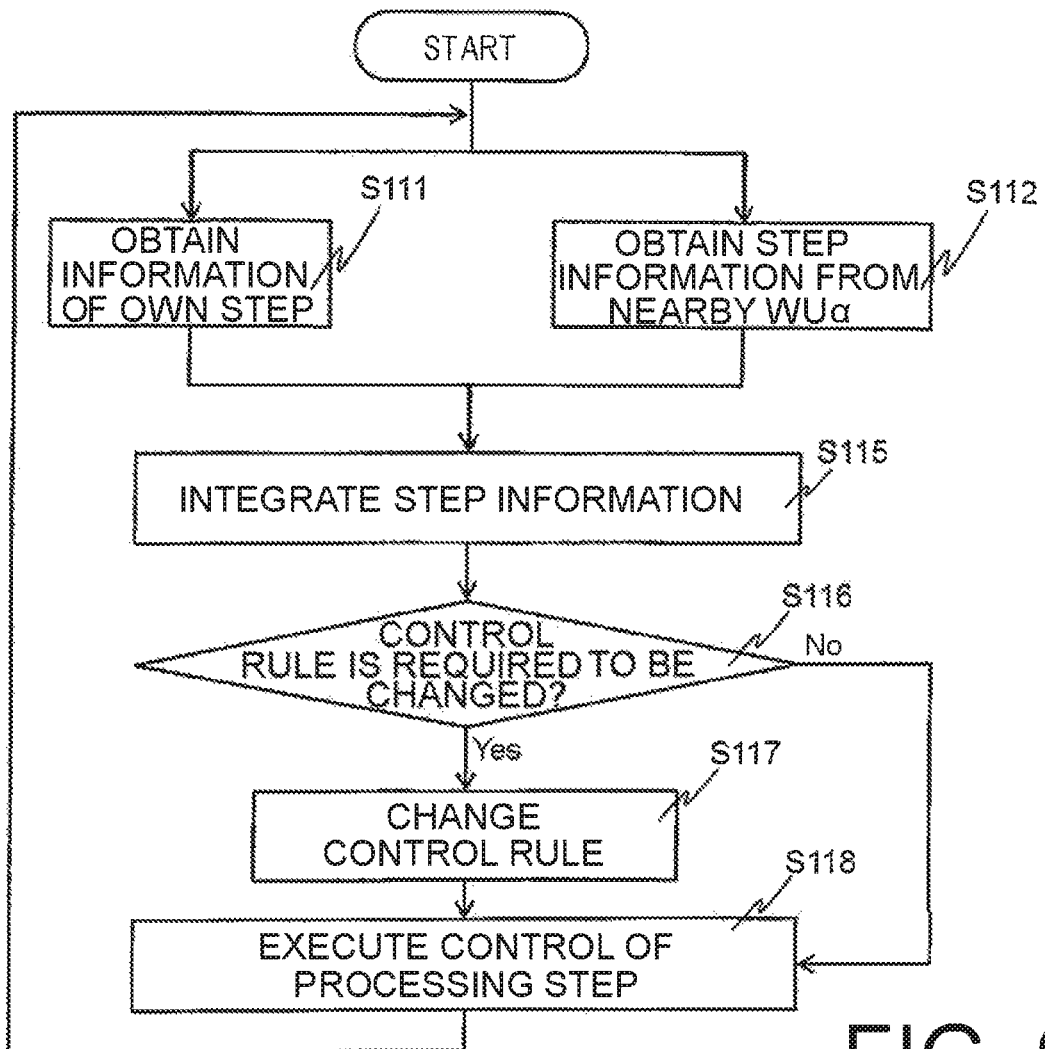
FIG. 6 is a flow chart for illustrating the operation of the WUβ in the first embodiment of this invention.

FIG. 6 is a flow chart for illustrating the operation of the WUβ 11. The processing sequence illustrated in FIG. 6 is merely an example. The processing sequence may be rearranged without changing the action and effects as long as the anteroposterior relation between processing steps illustrated in FIG. 6 is consistent. In the following description, a j-th WUβ is denoted as "WUβ 11_j".

The WUβ 11_*i* starts the operation and first obtains the processing step information of its own step as processing in the step information obtaining unit 11-2 (Step S111). In the first embodiment, the processing step information in one WUβ 11_*i* is the buffered quantity and the processing speed of equipment in the processing step, and the obtained buffered quantity value and the obtained processing speed of the equipment are expressed as xj(t) and vj(t), respectively.

At the same time, the WUβ 11_*i* obtains pieces of processing step information as processing in the step information obtaining unit 10-2 in each nearby WUα 10 (Step S112). The pieces of processing step information from the WUα's may be obtained asynchronously and, in that case, are held in a memory holding device or the like.

Next, the processing step information of its own step obtained in Step S111 and the pieces of processing step information of the nearby WUα's 10 obtained in Step S112 are integrated as the operation of the step information integrator 11-4 (Step S115). It is assumed that, for example, the obtained pieces of processing step information are the processing step information from the L-th WU to the M-th WU, where L and M satisfy L<M (i.e., the L-th WU is closer to the exit for products). In the first embodiment, the L-th WU and the M-th WU are compared in, for example, maximum amplitude values of their buffers. Transitions of the buffered quantity in a certain time range are recorded for each of the L-th WU and the M-th WU to record a local maximum value xLmax and a local minimum value xLmin in the L-th WU, and a local maximum value xMmax and a local minimum value xMmin in the M-th WU.

The controller 11-1 determines whether to change the control rule of its own step, based on the processing step information integrated in Step S115 (Step S116). For example, the controller 11-1 in the first embodiment compares the local maximum values and local minimum values obtained in Step S115 and, when a trend of amplitude increase in a direction from the L-th WU to the M-th WU is observed, namely, when xLmax<xMmax is true and a difference expressed by xMmax−xLmax exceeds a certain threshold value, determines that a change of the control rule is required. Alternatively, when the system stabilizes as a result of raising the parameter and perturbation accordingly decreases sufficiently, the controller 11-1 determines that the control rule is required to be changed so that the parameter is decreased little by little.

When determining that a change of the control rule is required, the controller 11-1 increases the control parameter kβ in Expression (3) by an amount equal to a predetermined value, for example (Step S117).

The controller 11-1 next executes control of the processing step irrespective of whether the parameter has been changed. For example, the controller 11-1 follows Expression (3) to adjust the processing speed of the processing equipment based on the buffered quantity of its own step (Step S118).

The WUβ obtains information of its surroundings and changes its own control rule by repeating Steps S111 to S118 described above. The WUβ thus performs control to prevent not only its own buffer but also the buffers of nearby WUα's from overflowing.

Effects of the First Embodiment

According to the first embodiment, the configuration described above enables the work line to protect a certain gain characteristic in transfer functions throughout the work line by using, for each WUβ, local information about nearby WUα's near the WUβ, without collecting information from all WU's. The use of the method described above also allows each WUβ to perform control without changing the parameter in a situation in which perturbation is small to begin with and the gain accordingly requires no suppression. When perturbation is large enough to require the suppression of the gain, on the other hand, the WUβ senses this from the information of nearby WUα's, changes the control parameter of the WUβ, and reduces the gain of a local transfer function in the surrounding WU's.

In the manner described above, it is possible to build a work line that operates efficiently based on local information, without gathering information from all WU's and without requiring processing equipment to run at excessively high specifications due to estimation that uses the worst value.

In the first embodiment, the control method has been described based on Expression (1), Expression (2), and Expression (3). However, this invention is not particularly limited to operation environments based on Expressions (1) to (3). Generally speaking, when the operation of the WUα's surrounding one WUβ is approximately describable by a mathematical model, local operation around the WUβ is approximately describable by a mathematical model as well. Further, when the operation is expressed by a non-linear differential equation, the system dynamics may be described with the use of linear approximation around an equilibrium point, or the like.

The dynamics around each WUβ may be modeled with the use of a state space model. In this case, dynamics observed in nearby WUα's near the WUβ when the control parameter of the WUβ is changed can be understood qualitatively by using a relationship between the control parameter of the WUβ and an eigenvalue of the dynamics. For example, the relationship may be used to adjust the parameter of the WUβ so that the system is directed toward a desired direction from information about the nearby WUα's near the WUβ.

When the system is described by a multidimensional state space model, the system dynamics may be estimated approximately by approximation that uses a set of dominant eigenvalues. The system may also be modeled by an expression other than the state space model, for example, a Petri net model.

For example, in the embodiments of this invention, transfer functions of nearby WUβ's may be estimated for each WUβ to change the control rule of the WUβ so that the system is stabilized. This may be accomplished by, for example, tentatively determining mathematical models of the WU's from business operation characteristics, device characteristics, and the like that are known in advance, and obtaining transfer functions of the mathematical models. The transfer functions are linked to obtain a local transfer function. Alternatively, a transfer function in a certain time range may be estimated for each WUβ from, for example, real-time information about local inputs and outputs. The control rule of the WUβ may be changed so that, for example, a stability margin of the estimated transfer function shifts to a desired stability margin. The control rule of the WUβ may also be changed so that a gain margin, phase margin, and the like of the estimated transfer function takes a desired value.

In the first embodiment, information about the buffered quantity and processing speed information of equipment are used as the processing step information. However, processing acceleration information, or information obtained by N-th-order differentiation of the buffered quantity, for example, may be used as the processing step information. In the first embodiment, the buffered quantity and processing speed information of the next step are obtained as the processing step information of one WUα. However, the WUα may be controlled with the use of various types of information obtained from its nearby WUα.

In the first embodiment, extremum values of the buffered quantity in a certain time range are used for each WUβ as the processing step information of nearby WUα's near the WUβ, but secondary information obtained by statistically processing various types of processing step information, for example, may be used as the processing information of the nearby WUα's 10. The secondary information may be, for example, an average value in an appropriate time range, or processing step information smoothed over an appropriate time range. A predicted value that is estimated from the obtained processing step information, for example, may also be used. When the operation of one WUα is tentatively determined by a mathematical model, for example, a parameter value of the WUα that most closely reflects measured data may be estimated to use the predicted value of the processing step information of the next WUα. The processing step information to be used may also be information obtained by performing filtering processing that uses a Kalman filter, or various other types of filtering processing, on a measured value in order to remove noise or other components.

Second Embodiment

[Description of the Configuration]

The configuration and operation of a flow control system according to a second embodiment of this invention are described next. In the second embodiment, there is described a case of applying this invention to a line in which the processing speeds of processing steps are adjusted by moving workers, as in a processing line attended by assembly workers. In short, even in the second embodiment, processing steps are adjustable in speed. Components and operation that are the same as those in the first embodiment are denoted by the same reference numbers, and descriptions thereof are omitted.

Figure 7:
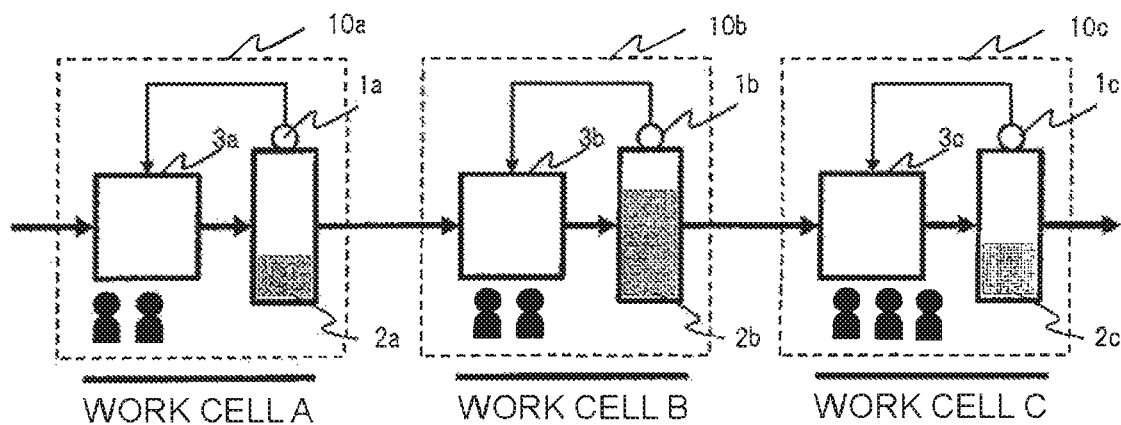
FIG. 7 is a schematic diagram for illustrating a configuration example of a work management system as another example of the flow control system to which this invention may be applied.

FIG. 7 is a diagram for illustrating a configuration example of a work management system as another example of the flow control system, to which the second embodiment of this invention may be applied. As in the first embodiment, a series of work cells is aligned along a one-dimensional work line. The flow of processing is in one direction from an upstream cell to a downstream cell. In each work cell, workers handling work of the cell are assigned to perform work unique to the assigned work cell on articles sent from an upstream work cell, and stacks the worked-on articles in a buffer provided for the next work cell. The workers adjust work (particularly the work speed) to avoid buffer overflow and buffer starvation.

The second embodiment differs from the first embodiment in that the processing speed is adjusted manually, not by equipment, in that each WUβ is implemented by adding elements that are required in any WUβ to one of the WUα's, in that an interval at which WUβ's are arranged is determined based on a measured value and is not numerically obtained, and in that WUβ's cooperate with each other to exchange information.

Figure 8:
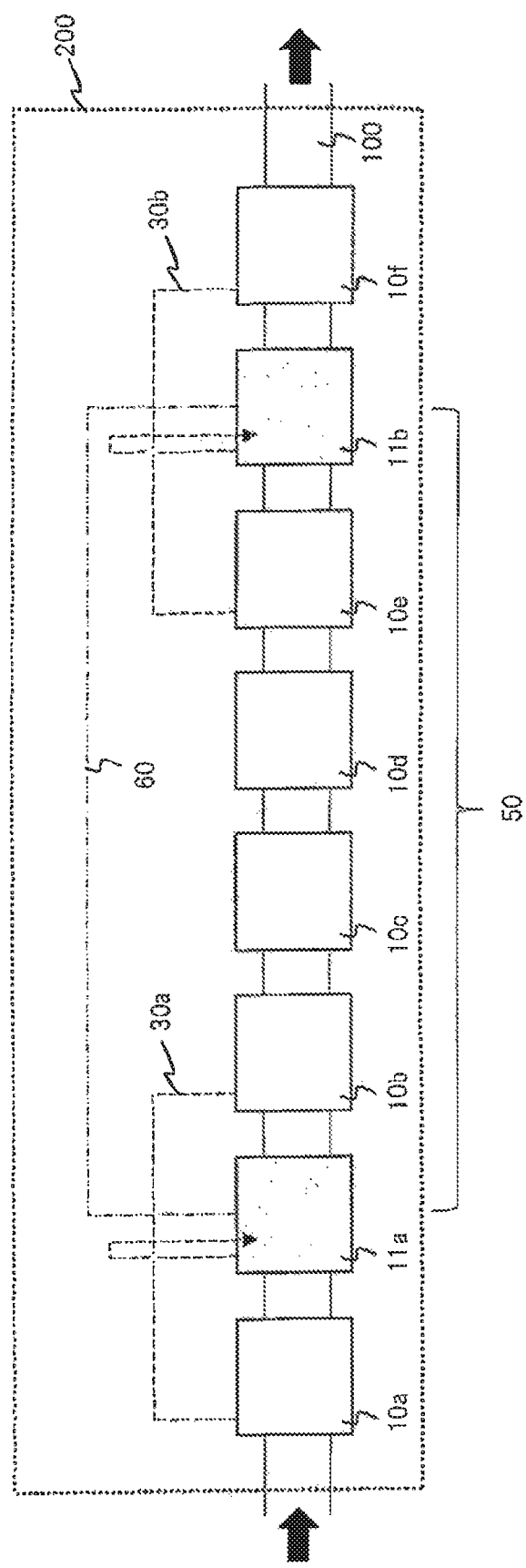
FIG. 8 is a schematic diagram for illustrating a configuration example of a flow control system according to a second embodiment of this invention.

FIG. 8 is a diagram for illustrating an overall configuration example of the flow control system 200 according to the second embodiment. In FIG. 8, similarly to the first embodiment, the flow control system 200 includes the plurality of work units α (hereinafter abbreviated as "WUα's") 10a to 10f, and the plurality of work units β (hereinafter abbreviated as "WUβ's") 11a and 11b. The WU's are linked by a work line 100, and a production article is produced along the work line through processing at the respective WU's. In this case, the WUβ's 11 are placed in some areas along the work line 100 in accordance with the predetermined distribution 50. The WUβ's 11 are connected to each other by a network 60, which allows the WUβ's 11 to share their pieces of processing step information with each other.

Figure 9:
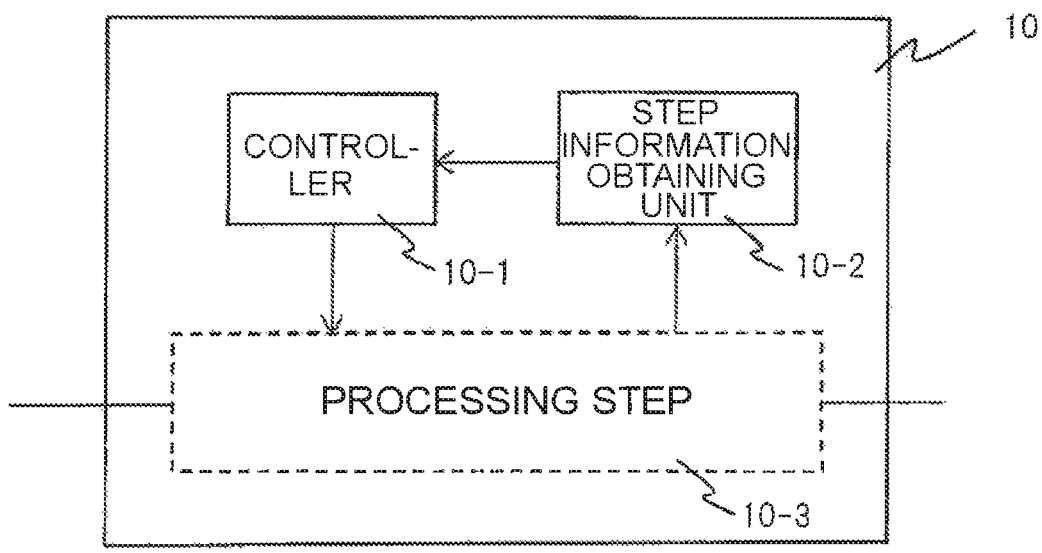
FIG. 9 is a block diagram for illustrating a configuration example of a WUα in the second embodiment of this invention.

FIG. 9 is a block diagram for illustrating a configuration example and operation of each WUα 10 in the second embodiment. The WUα 10 handles the processing step 10-3, and includes at least the step information obtaining unit 10-2, which obtains processing step information, and the controller 10-1, which controls the processing step. The processing step 10-3 is, for example, a step in which, as illustrated in FIG. 7, a worker assigned to a work area 3a performs work unique to the work area 3a and places the worked-on articles in the buffer 2a. In the second embodiment, the processing step 10-3 and the processing step of its adjacent WUα 10 or WUβ 11 are also assumed to be successive to one another in terms of process, and an article in the buffer 2a for a work cell A in FIG. 7, for example, is processed in a work area 3b in a work cell B, which is the next work cell. The processing step information is information about the progress and state of the processing step, and is, for example, the buffered quantity in the processing step and the processing speed in the work cell in the second embodiment. As in the first embodiment, whether the buffered quantity is to be increased or decreased is determined by a difference in the processing speed of the equipment between the preceding step and the next step.

It is assumed that Expression (1) to Expression (3) in the first embodiment are established with respect to rough operation of the system in the second embodiment as well.

As in the first embodiment, the step information obtaining unit 10-2 uses, for example, sensors to obtain the buffered quantity, the processing speed, and the like. The controller 10-1 calculates a goal work speed based on the control rule of Expression (3). However, speed adjustment is actually conducted by workers. For example, a work speed to be aimed for is calculated based on Expression (3) and is relayed to a worker via a display device or the like. The worker adjusts the work speed by following the instruction displayed on the display device.

In the second embodiment, the constant hi in Expression (1) to Expression (3) also indicates, for example, the maximum buffer capacity value as in the first embodiment. The highest processing speed parameter Vi is determined by, for example, the number of workers working in the work area, and the sum of abilities of the individual workers. The speed adjustment coefficient ki is, for example, an index affected by frequency at which the objective work speed displayed in the work area is updated, and depends on the number of workers as well.

In the second embodiment, the distribution 50 of the WUβ's 11 is calculated based on the result of measuring data of the processing line. For example, the processing line is placed in a certain equilibrium state by giving a periodic input to the goal production quantity. A periodic response is issued in response to the periodic input when the processing line is stable throughout. A parameter is set in a specific WUβ 11. For example, the number of workers to work in the WUβ 11 is fixed to P workers, which is a standard number of workers. The processing step information of WUα's around this WUβ 11 is obtained by measurement. For example, a change in the buffered quantity of one WUα is measured in comparison to a change in the buffered quantity of a WUα that immediately precedes the WUβ 11. The system records the number of linked WU's counted from one WUβ at which a change in gain in control performed by the WUβ is contained within a certain threshold value. The system next records the number of linked WU's that is observed when the number of workers is increased from P workers to Q workers.

A range of influence of control performed when the control parameter of the WUβ is set to Q workers can thus be obtained. When the maximum number of workers in one WUβ is substantially predetermined from limitations imposed by the work area or other factors, a range of influence of control at the maximum number of workers is obtained, and the WUβ is placed in a range that does not exceed the range of influence. In this manner, WUβ's can be arranged so that gains are kept to a certain standard throughout the processing line by adjusting the control parameters of the WUβ's.

When a position in the system at which one of the WUα's is allowed to turn into one of the WUβ's is determined in advance, on the other hand, back calculation from that position is performed to determine an upper limit to adjustable parameters of the WUβ's so that ranges of influence of all WUβ's cover the entire system. In the second embodiment, the maximum number of workers is determined for an area of interest, and a work area that can hold the determined maximum number of workers is then secured. In this manner, gains can be kept to a certain standard throughout the processing line by adjusting the control parameters of the WUβ's.

Figure 10:
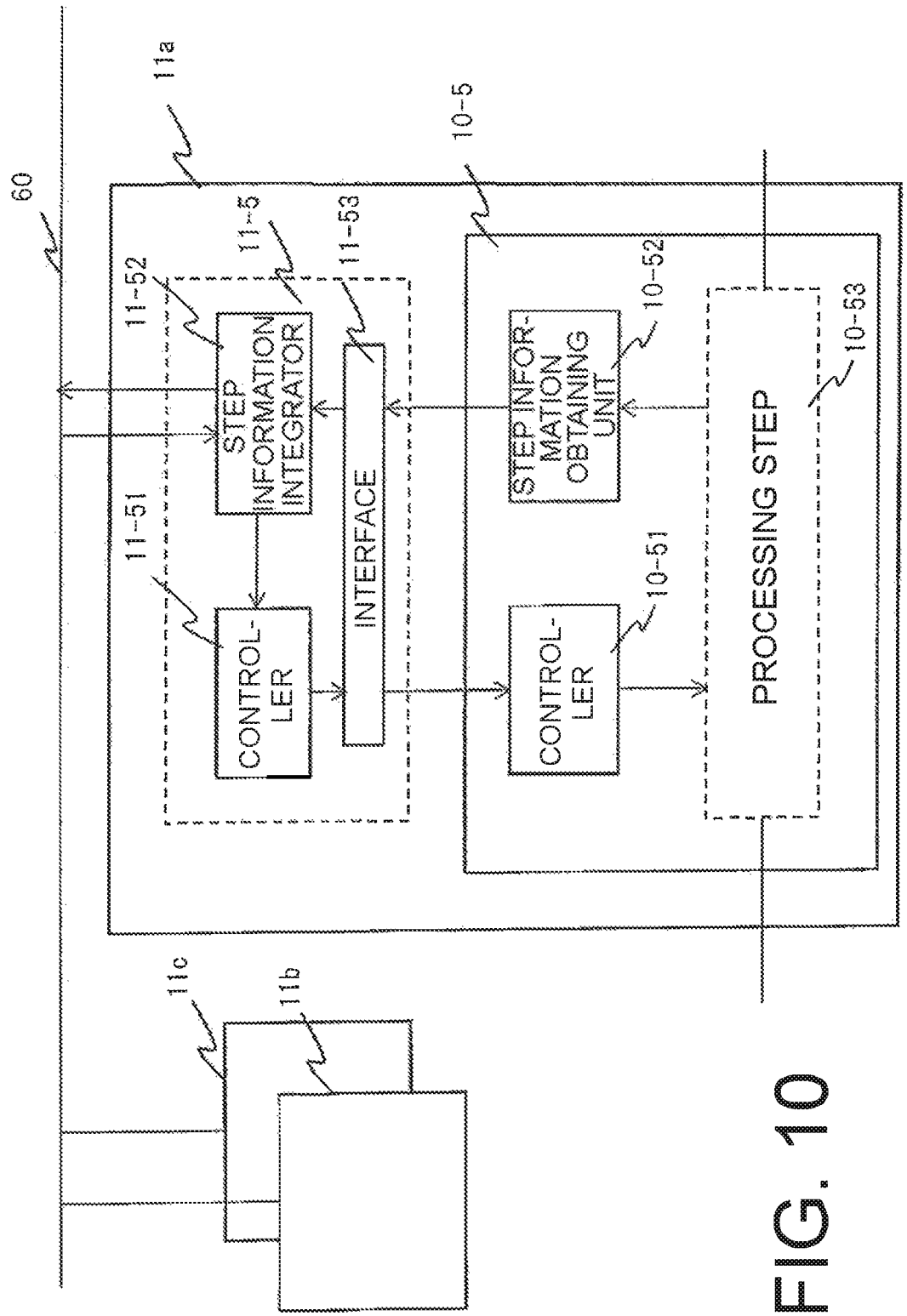
FIG. 10 is a block diagram for illustrating a configuration example of a WUβ in the second embodiment of this invention.

FIG. 10 is a block diagram for illustrating a configuration example and operation of each WUβ 11 in the second embodiment. The WUβ 11 includes at least a WUα component 10-5, which is the same as the WUα 10 of FIG. 9, and an extended control module 11-5. The extended control module 11-5 includes at least an interface 11-53, which is an interface to the WUα component 10-5, a step information integrator 11-52, and a controller 11-51. A processing step 10-53 handled by the WUα component 10-5, a step information obtaining unit 10-52, and a controller 10-51, which are included in the WUα component 10-5, are defined the same as those in the WUα's described above, and descriptions thereof are therefore omitted. Information may be sent directly from the step information obtaining unit 10-52 to the controller 10-51. In that case, a control signal is determined in the extended control module 11-5 from its own step information alone as in the WUα's, for example. A control parameter of the extended control module 11-5, however, is asynchronously rewritten to a value determined by the controller 11-51.

The step information integrator 11-52 in the second embodiment is connected to one or more WUβ's 11 by the network 60. The step information integrator 11-52 obtains the processing step information of nearby WUα's 10, and integrates the processing step information obtained by the step information obtaining unit 10-52 of its own step with the processing step information obtained through the interface 11-53. The step information integrator 11-52 may further obtain the processing step information of the surrounding WUα's 10 as in the first embodiment. The controller 11-51 uses the integrated information obtained in the step information integrator 11-52 to control the WUα component 10-5 through the interface 11-53 so that the β control objective is achieved.

[Description of the Operation]

In the second embodiment, the operation of the WUα's 10 is mostly the same as the operation of the WUα's described in the first embodiment with reference to FIG. 5. An i-th WUα, which is denoted as WUα 10_$i$, starts the operation and first obtains the processing step information as processing in the step information obtaining unit 10-52 (corresponding to Step S101 of FIG. 5). In the second embodiment, the processing step information in one WUα 10_$i$ is the buffered quantity and the processing speed in the work area of the processing step, and the obtained buffered quantity value and the obtained processing speed in the work area are expressed as xi(t) and vi(t), respectively. The value of the buffered quantity is obtained from, for example, a sensor accompanying equipment. The processing speed in the work area is obtained from, for example, a sensor. Alternatively, the processing speed may be calculated from the amount of change in the obtained buffered quantity. Next, the controller 10-1 calculates a control variable of processing step control from the obtained processing step information and from α control rule stored in the built-in storage or an external storage (not shown).

In the second embodiment, a change amount dvi/dt of the processing speed of the equipment in the WUα 10_$i$ is determined by, for example, Expression (2) (corresponding to Step S102 of FIG. 5). Next, a goal processing speed in the work area is presented based on the obtained change amount of the processing speed. Each worker adjusts his/her work speed so that sequentially displayed goal speeds are reached (corresponding to Step S103 of FIG. 5). The WUα performs control to prevent its buffer from overflowing by repeating the steps described above.

Figure 11:
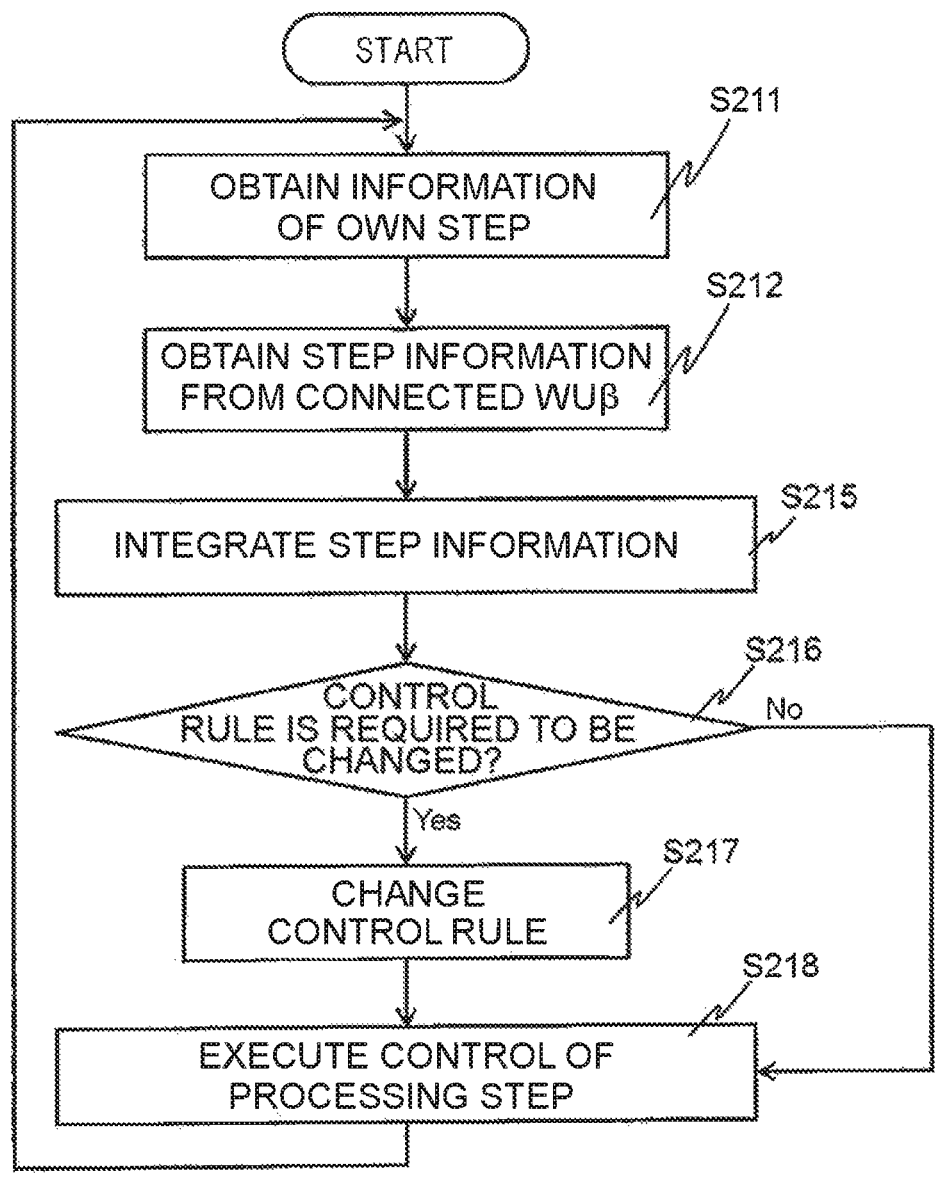
FIG. 11 is a flow chart for illustrating the operation of the WUβ in the second embodiment of this invention.

FIG. 11 is a flow chart for illustrating the operation of the WUβ 11 in the second embodiment. Here, a j-th WUβ is denoted as "WUβ 11_$j$".

In FIG. 11, the WUβ 11_$i$ starts the operation and first obtains the processing step information of its own step as processing in the processing information obtaining unit 10-52 in the WUα component 10-5 (Step S211). In the second embodiment, the processing step information in one WUβ 11_$j$ is the buffered quantity and the processing speed of equipment in the processing step, and the obtained buffered quantity value and the obtained processing speed of the equipment are expressed as xj(t) and vj(t), respectively.

The WUβ 11_$j$ next obtains the step information of another WUβ 11, to which the WUβ 11_$j$ is connected, by the network 60 (Step S212). The WUβ 11_$j$ may additionally obtain the processing step information from nearby WUα's as in the first embodiment.

The operation of the step information integrator 11-52 is executed next. The step information integrator 11-52 first obtains, through the interface 11-53, its own processing step information obtained in Step S211. The step information integrator 11-52 subsequently integrates the processing step information of its own step obtained in Step S211 with the step information of another WUβ 11 obtained in Step S212 (Step S215). It is assumed that, for example, the obtained pieces of step information are the pieces of information of the L-th WU and the M-th WU, where L and M satisfy L<M (i.e., the L-th WU is closer to the exit for products). In the second embodiment, the controller 11-51 compares, for example, maximum amplitude values of buffers of the L-th WU and the M-th WU. The controller 11-51 records transitions of the buffered quantity in a certain time range for each of the L-th WU and the M-th WU to record in the storage a local maximum value xLmax and a local minimum value xLmin in the L-th WU, and a local maximum value xMmax and a local minimum value xMmin in the M-th WU.

The controller 11-51 determines whether to change the control rule of its own step, based on the processing step information integrated in Step S215 (Step S216). For example, the controller 11-51 compares the local maximum values and local minimum values obtained in Step S215 and, when a trend of amplitude increase in a direction from the L-th WU to the M-th WU is observed, namely, when xLmax<xMmax is true and a difference expressed by xMmax−xLmax exceeds a certain threshold value, determines that the change of the control rule is required. When determining that the change is required, the controller 11-51 increases the control parameter kβ in Expression (3) by an amount equal to a predetermined value, for example (Step S217).

Next, the controller 10-51 receives a result of the determination made by the controller 11-51, and executes control of the processing step 10-53 irrespective of whether the parameter has been changed. For example, the controller 10-51 follows Expression (3) to issue an instruction to change the number of workers in the work area based on the buffered quantity of its own step (Step S218). When the control rule of the WUβ 11_j is based on Expression (3), an instruction about whether to increase or reduce workers in the work area is presented based on the adjustment coefficient of the control rule. The WUβ performs control to prevent not only its own buffer but also the buffers of nearby WUα's from overflowing by repeating Step S211 to S218 described above.

Effects of the Second Embodiment

According to the second embodiment, the configuration described above enables the work line to protect a certain gain characteristic in transfer functions throughout the work line by using, for each WUβ, local information about nearby WUα's near the WUβ, without collecting information from all WU's. The use of the method of the second embodiment also allows each WUβ to perform control without changing the parameter in a situation in which perturbation is small to begin with and the gain accordingly requires no suppression. When perturbation is large enough to require the suppression of the gain, on the other hand, the WUβ senses this from the information of nearby WUα's, changes the control parameter of the WUβ, and reduces the gain of a local transfer function in the surrounding WU's. In the manner described above, it is possible to build a work line that operates efficiently based on local information, without gathering information from all WU's and without requiring processing equipment to run at excessively high specifications due to estimation that uses the worst value.

In the second embodiment, it is described that the placement of the range of the WUβ that has a predetermined parameter value is determined based on measurement. For example, data may be obtained and analyzed every day or every few days to determine a more appropriate position of the WUβ based on the data.

It is also described that, when the position of the WUβ is specified in advance, the maximum value of a parameter of the WUβ is determined based on measurement. The maximum value of the WUβ may be redesigned at time intervals of some length based on data.

Third Embodiment

The configuration and operation of a flow control system according to a third embodiment of this invention are described next. The third embodiment deals with a case of applying this invention to flow control of vehicles on roads in a two-dimensional grid pattern by adjusting timing of a traffic light at a traffic intersection. Components and operation that are the same as those in the first embodiment or the second embodiment are denoted by the same reference numbers, and descriptions thereof are omitted.

An object of the third embodiment is to place vehicles crowding a road into an even flow of traffic in a network of roads, and the third embodiment shows that this invention is applicable to two dimensions as well as one dimension.

Figure 12:
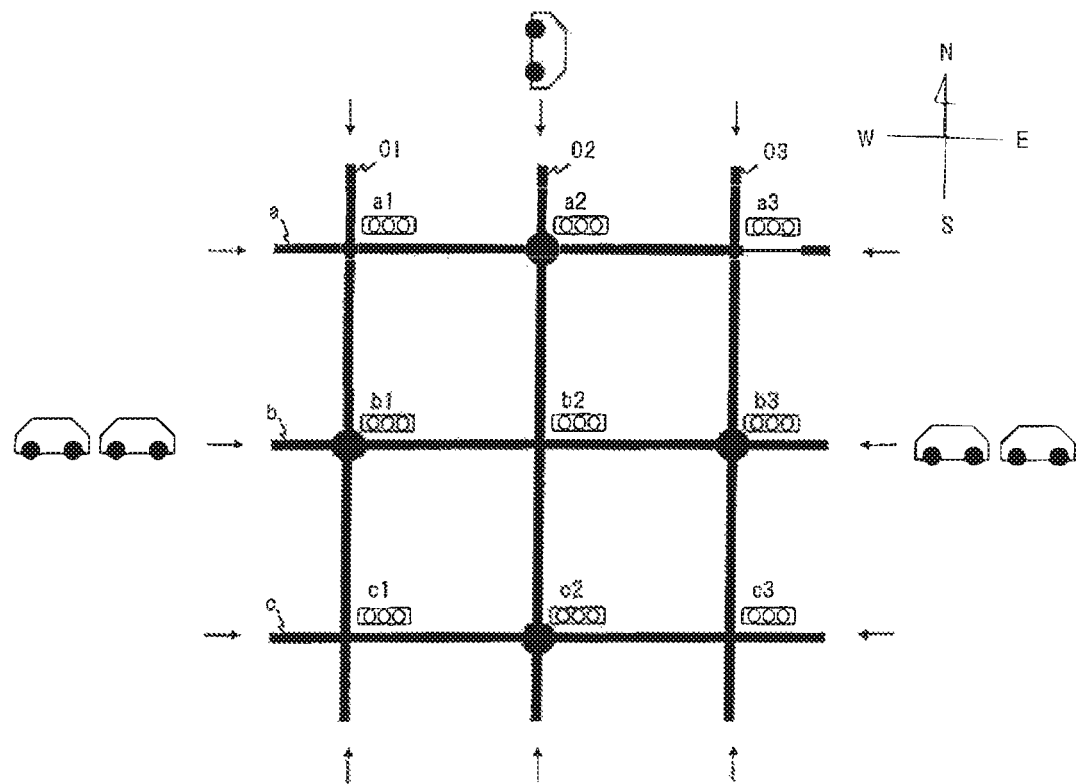
FIG. 12 is a diagram for illustrating a traffic control system to be applied to grid-patterned roads as still another example of the flow control system to which this invention may be applied.

FIG. 12 is a diagram for illustrating a traffic control system applied to grid-patterned roads. The grid-patterned roads include three arterial roads a, b, and c running in the east-west direction and three arterial roads 01, 02, and 03 running in the north-south direction, and the east-west roads intersect with the north-south roads at nine traffic intersections (a1 to a3, b1 to b3, and c1 to c3). One traffic light control unit is installed at each traffic intersection. Each traffic light control unit has one traffic light in each of the east direction, the west direction, the north direction, and the south direction, that is, four traffic lights in total, and controls the light in each direction. The traffic lights in the east-west direction and the traffic lights in the north-south direction are basically synchronized to be repeatedly lit in red, green, and yellow, which indicates transition between red and green, in a suitable cycle. A traffic light control unit of this type controls the switching of lights to be displayed by, for example, adjusting the cycle length, a split (the allocation of time to a traffic light of one direction out of one cycle of time), and an offset. Although two roads intersect at each traffic intersection in the case described in the third embodiment, three or more roads may intersect at one traffic intersection. Each traffic light control unit in this case may include five or more traffic lights. The number of traffic lights included in one traffic light control unit may also be three or less.

A case in which vehicles enter grid-patterned roads from four directions is discussed. Vehicles coming up to the traffic intersections turn right or left at a suitable probability. The premise here is that the traffic lights installed at the nine traffic intersections (a1 to c3) illustrated in FIG. 12 are of sensing type, which is basic control.

A sensing-type traffic light detects the traffic state of a route with a vehicle sensor. Specifically, a sensing-type traffic light detects that a vehicle has stopped in one direction with a vehicle sensor and, after a fixed length of time, turns a light for vehicles and a pedestrian light accompanying the light for vehicles green. Entrance of a vehicle to the traffic intersection a2 of FIG. 12 is discussed. At a time t0, the traffic lights in the east-west direction and the traffic lights in the north-south direction in the traffic light control unit of the traffic intersection a2 are green and red, respectively. One vehicle now approaches the traffic intersection a2 from the north direction on the arterial road 02. The vehicle stops because the traffic light in a direction from the north direction to the south direction at the traffic intersection a2 is red. A vehicle sensor included in the traffic light control unit at the traffic intersection a2 reacts to the vehicle, and the traffic light control unit performs control to change the traffic light in the east-west direction to red and the traffic light in the north-south direction to green after a length of time indicated by a time parameter τ of the traffic light control unit elapses.

Through the control operation described above, the traffic light at the traffic intersection a2 turns green after a length of time indicated by T elapses since the arrival of the first vehicle from the north direction, to thereby allow the vehicle to pass. In particular, sensing-type control is sufficient in many cases, when the vehicle flow rate is low. However, the simple mechanism of sensing-type control is an inhibition to the obtainment of statistical information such as the number of vehicles and the volume of traffic, which makes it difficult to keep the vehicle flow optimum in a traffic network when the network of roads is complicated and when the vehicle flow rate increases.

It is known that a maximum flow rate at a traffic intersection is reached generally by allocating time so that the length of time for which a traffic light at the traffic intersection is lit in green is in proportion to the ratio of the flow rate in a longitudinal (e.g., north-south) direction and the flow rate in a lateral (e.g., east-west) direction. With sensing-type control, however, it is difficult to set the traffic light to a lighted time ratio that is based on the vehicle flow rate in the vertical direction and the vehicle flow rate in the lateral direction.

In Patent Documents 5 and 6 described above, there is proposed a decentralized control method, in which various types of information such as the number of vehicles and volume of traffic mentioned above, and vehicle acceleration information are obtained at each traffic intersection, and control is performed through an exchange of information with an adjacent traffic light, as a control method for use in the complicated network of roads. However, the introduction of sophisticated control to every traffic intersection requires a high introduction cost.

Accordingly, an example of introducing traffic light control units of a sophisticated control method to only some of traffic intersections in a network of roads where traffic lights are controlled by sensing-type control is described in the third embodiment. In the third embodiment, sensing-type traffic light control units are, for example, WUα's, and sophisticated traffic light control units accompanied by a vehicle flow rate sensor and a destination obtaining device are, for example, WUβ's.

[Description of the Configuration]

Figure 13:
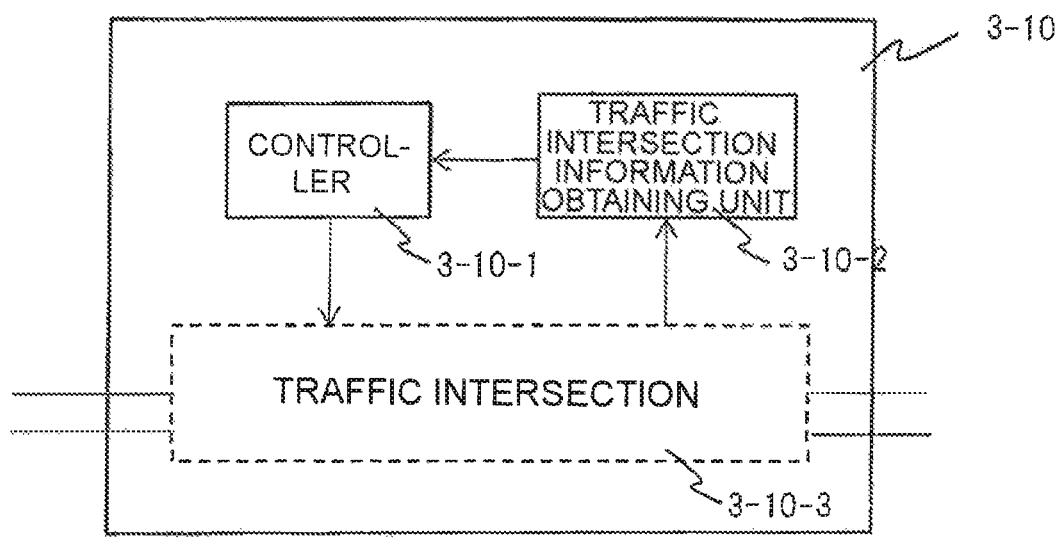
FIG. 13 is a block diagram for illustrating a configuration example of a WUα in a third embodiment of this invention.

FIG. 13 is a block diagram for illustrating a configuration example of each WUα in the third embodiment. The WUα in the third embodiment is, for example, a sensing-type traffic light control unit. A WUα 3-10 in the third embodiment handles a traffic intersection (corresponding to the processing step) 3-10-3, and includes at least a traffic intersection information obtaining unit (corresponding to the step information obtaining unit) 3-10-2, which obtains traffic intersection information from the traffic intersection 3-10-3, and a controller 3-10-1, which controls traffic lights of the traffic intersection based on the traffic intersection information obtained by the traffic intersection information obtaining unit 3-10-2. The traffic intersection information in the third embodiment is, for example, vehicle arrival information, which is obtained by a vehicle sensor included in the traffic light control unit. Each traffic intersection is linked to adjacent traffic intersections by roads. In the north-south direction in FIG. 12, for example, a road on the north side of the traffic intersection b2 is connected to a road on the south side of the traffic intersection a2, and a road on the south side of the traffic intersection b2 is linked to a road on the north side of the traffic intersection c2. The traffic intersections are linked in a similar manner in the east-west direction as well. A vehicle currently stopped by the red light at one traffic intersection heads toward one of the traffic intersections adjacent to the one traffic intersection when the traffic light of the one traffic intersection that is in the direction of the vehicle changes to green.

The distance from the one traffic intersection to its adjacent traffic intersection is a fixed distance. When the vehicle speed is constant to a certain extent, the vehicle accordingly arrives at the adjacent traffic intersection with an offset time from the time of the change to green light. The vehicle can therefore pass through the adjacent traffic intersection without stopping, by performing control in which the offset time is added at the adjacent traffic intersection. A rise in the overall flow efficiency of the traffic network can consequently be expected. However, equipment investment for installing a sophisticated traffic light control unit at every traffic intersection is required in order to enable all traffic intersections to cooperate with one another, which pushes up an investment cost.

As a possible solution, it is considered to allow only some of traffic intersections to cooperate and cooperatively control a normal traffic intersection near the cooperating traffic intersections through the cooperation. To give a specific example, the traffic intersection b2 in FIG. 12 is regarded as a center and the traffic intersections a2, b1, b3, and c2, which border the traffic intersection b2, are discussed. Distances from the traffic intersection b2 to each of the traffic intersections a2, b1, b3, and c2 are known in advance. The speed profile of a vehicle moving from the traffic intersection b3 to the traffic intersection b2 is modeled in advance. The speed profile is a model indicating how fast the vehicle accelerates after the traffic light changes to green, and then how fast the vehicle travels.

For example, a vehicle is stopped by the red traffic light in the east-west direction at the traffic intersection b3. When it is known that the vehicle in the east-west direction is to drive straight from the east to the west, timing at which the vehicle that has been stopped starts and arrives at the traffic intersection b2 is controllable by timing at which the traffic light in the east-west direction at the traffic intersection b3 changes to green. Similarly, when a vehicle at the traffic intersection a2 in the north direction is to head to the south from the north, timing at which the vehicle leaving the traffic intersection a2 arrives at the traffic intersection b2 is controllable by controlling timing at which the traffic light in the north-south direction changes to green. Each traffic light at the traffic intersection b2 is of sensing type, and timing at which the traffic light changes to green is accordingly controlled indirectly by the timing at which a vehicle arrives at the traffic intersection b2. When the vehicle flow density is high, in particular, it is expected that there are waiting vehicles in all directions all the time. Therefore, it is understood that, by causing the four traffic intersections adjacent to the traffic intersection b2 to be cooperatively controlled, the timing of switching lights at the traffic intersection b2 can be controlled as well.

The description given above proves that one WUα can be controlled indirectly by cooperation among four WUβ's adjacent to the WUα. From the opposite perspective, this means that control of one WUβ affects at least four adjacent WUα's.

When the WUβ at one traffic intersection is controlled at a sufficient level of vehicle flow density, the WUα adjacent to the WUβ in the east direction, for example, is strongly affected by the timing of switching the traffic lights in the east-west direction in the WUβ, for the reason described above. Another WUα is found one traffic intersection further in the east direction, and is denoted as WUα3 for the sake of convenience. The WUα located between the WUα3 and the WUβ is denoted as WUα2. In short, a series of WU's is arranged along a road in the order of WUβ→WUα2→WUα3 from the west. A group of vehicles passing through the WUβ from the west to the east travels toward the WUα3 with a certain speed profile. Vehicles in the group of vehicles turn right or left at a certain probability, and become highly dispersed from one another when running a long distance, but some of the vehicles arrive at WUα3. The timing of arrival at WUα3 is correlated to the timing of switching lights in the WUβ. That is, the WUα3 located on the same road as the WUα2, which is strongly affected by the WUβ as described above, is affected by the WUβ as well, although not as much as the WUα2. How much the WUα3 is affected by the WUβ depends on the length of the road, the number of lanes on the road, the number of hops from the WUβ (the number of interposed WU's, namely, traffic intersections), or the like. The degree of influence of the WUβ generally decreases as the distance from the WUβ increases. The discussion made above deals with the influence of the WUβ in the west-to-east direction, but the same applies to the east-to-west direction and the north-south direction. In other words, the range of influence of the WUβ can be defined with the use of its adjacent traffic intersections in an expansion in two-dimensional directions (in a concentric pattern).

The use of a standard for distribution to a two-dimensional grid field to contain the range of influence of the WUβ within a certain range of threshold values is discussed. The standard is a range in which the degree of influence of the WUβ is equal to or above a threshold value. For example, WUβ's are placed at the traffic intersections a2, b1, b3, and c2 as in FIG. 12.

Figure 14:
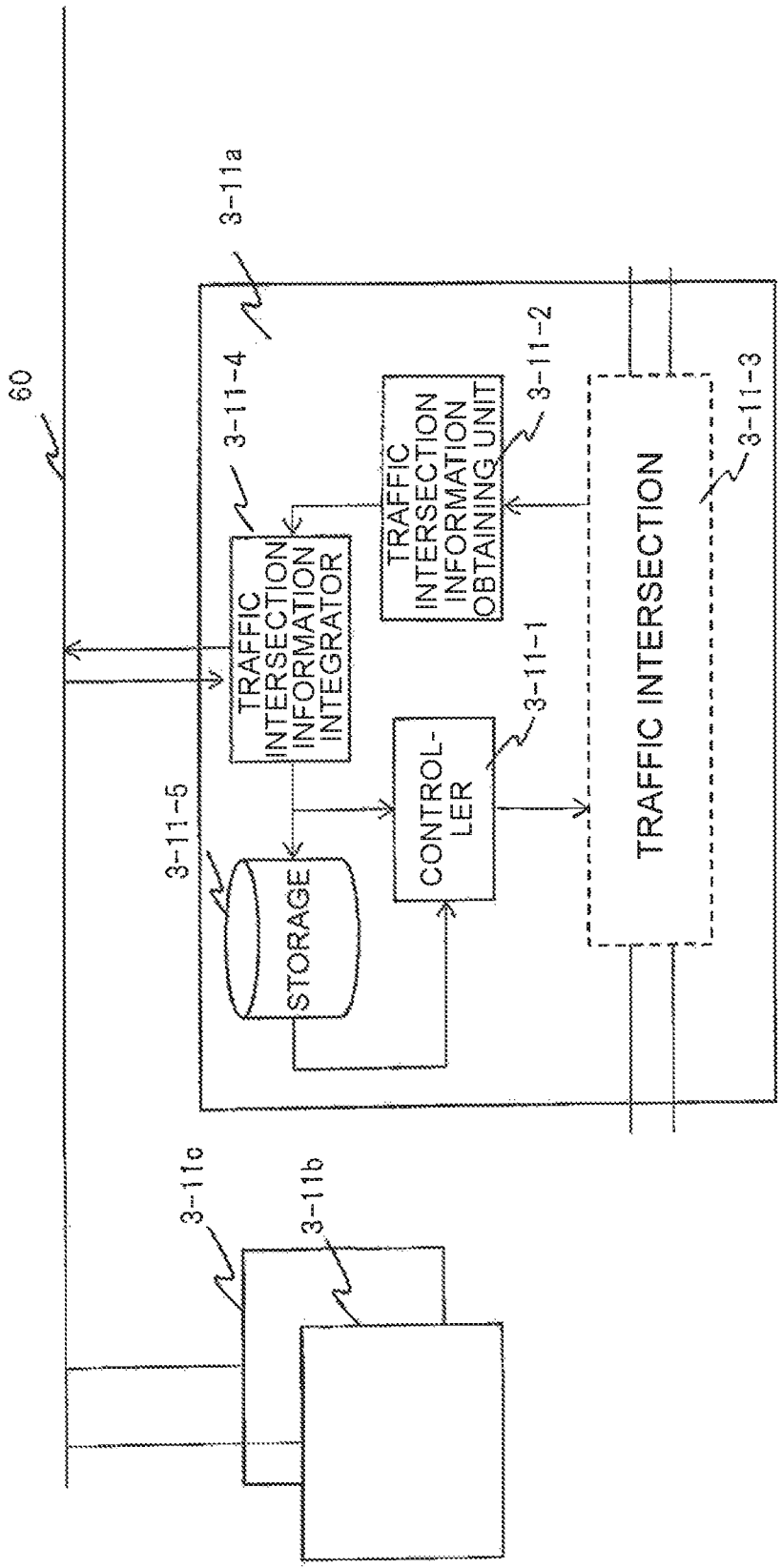
FIG. 14 is a block diagram for illustrating a configuration example of a WUβ in the third embodiment of this invention.

FIG. 14 is a block diagram for illustrating a configuration example of each WUβ in the third embodiment. The WUβ in the third embodiment handles a traffic intersection (corresponding to the processing step) 3-11-3, and includes at least a traffic intersection information obtaining unit (corresponding to the step information obtaining unit) 3-11-2, which obtains traffic intersection information, a traffic intersection information integrator (corresponding to the step information integrator) 3-11-4, which obtains traffic intersection information of other traffic intersections from a plurality of WUβ's connected by the network 60, namely, a WUβ 3-11b and a WUβ 3-11c, and which integrates the traffic intersection information of other traffic intersections with its own traffic intersection information obtained by the traffic intersection information obtaining unit 3-11-2, a storage 3-11-5, which stores α control rule and unique information of adjacent WUα's and WUβ's, and a controller 3-11-1, which controls the traffic intersection (traffic light control unit) based on information from the storage 3-11-5 and from the traffic intersection information integrator 3-11-4.

The traffic intersection information is, for example, the number of vehicles lined up in its own traffic intersection, and destination information about the destinations of the vehicles. The number of vehicles is detected by, for example, various weight sensors, ultrasonic sensors, and dielectric sensors. The destination information may be obtained by, for example, picking up an image of waiting vehicles with a camera, and figuring out, through image processing or the like, the number of vehicles in a left-turn-only lane, the number of vehicles in a right-turn-only lane, and whether a turn signal is lit.

The traffic intersection information of other traffic intersections obtained via the network 60 is, for example, light switching timing information about the immediate past timing of switching lights in the other traffic intersections, the numbers of vehicles lined up in the other traffic intersections, and destination information about the destinations of the vehicles. The unique information stored in the storage 3-11-5 is the distance from another traffic intersection to its own traffic intersection, an average vehicle speed profile for a drive up to the own traffic intersection, an average vehicle flow rate, and the like. A speed profile and average flow rate information may be prepared for each heavy-traffic time slot or light-traffic time slot in each time of day, for example, morning and evening.

The controller 3-11-1 controls the traffic intersection based on information obtained from the storage 3-11-5 and from the traffic intersection information integrator 3-11-4.

An example of the control rule of the WUβ is described. When the length of time for which a traffic light in the east-west direction is lit in green is τt seconds, the length of time for which a traffic light in the north-south direction is lit in green is τh seconds, the vehicle flow rate in the east-west direction is ft vehicles/minute, and the vehicle flow rate in the north-south direction is fh vehicles/minute, the traffic light in the east-west direction is changed to green at a time To. The traffic light remains green for τt seconds since then. After the elapse of τt seconds, the traffic light in the east-west direction is changed to yellow. After the yellow light is displayed for a fixed length of time (after τk seconds), the traffic light in the east-west direction is changed to red. At the elapse of a switching offset time Toff seconds, the traffic light in the north-south direction is changed to green, and is kept to green for τh seconds. After the elapse of τh seconds, the traffic light in the north-south direction is changed to yellow, keeps displaying yellow light for a fixed length of time (τk seconds), and is then changed to red.

The switching control described above is repeated. Here, the WUβ performs timing control with the use of an internal time measurement device or the like.

[Math. 4]

$$\tau_t = k_{ij} f_t \tag{4}$$

[Math. 5]

$$\tau_h = k_{ij} f_h \tag{5}$$

Relational expressions of τ are expressed as Expression (4) and Expression (5). The symbol kij represents an appropriate constant.

This enables the WUβ to change the ratio of the lengths of time for which the traffic lights are lit in green in relation to the ratio of the vehicle flow rate in the north-south direction and the vehicle flow rate in the east-west direction at the traffic intersection handled by the WUβ.

Strictly speaking, the ratio of the red light and the green light is not the same as the ratio of flow rates under the control rule described above, due to the constants τk and Toff, and may be corrected suitably.

With the control rule described above alone, however, although the light switching timing of its own traffic intersection can be controlled based on the vehicle flow rates, the light switching timing of adjacent WUα's cannot be controlled.

For instance, in the network of roads of FIG. 12, the vehicle flow rate is 4 vehicles/minute on the road a, 10 vehicles/minute on the road b, 20 vehicles/minute on the road c, 5 vehicles/minute on the road 01, 20 vehicles/minute on the road 02, and 10 vehicles/minute on the road 03. The flow rates are assumed to be independent of the vehicle direction for the purpose of simplification (for example, the flow rate of south-bound vehicles and the flow rate of north-bound vehicles are assumed to be equal to each other on the road 01). For simplification, turns of vehicles at each traffic intersection are not taken into consideration, and the ratio of the north-south flow rate and the east-west flow rate at each traffic intersection is assumed to be equal to the ratio of the flow rates on the roads given above.

Then, the flow rate ratios at a2, c2, b2, b1, and b3, which are traffic intersections of current interest, written in the format of [north-south flow rate: east-west flow rate] are [5:1], [1:1], [2:1], [1:2], and [1:1], respectively. When the traffic intersections a2, c2, b1, and b3 are handled by WUβ's, the ratio of the red light and the green light at each of the traffic light intersections can be kept to the vehicle flow rate ratio of the traffic intersection, and the traffic lights are switched at light switching timing as illustrated in (A) of FIG. 17.

At the traffic intersection b2, which is handled by one of the WUα's, the traffic lights are of sensing type and are accordingly switched at timing dependent on the light switching timing of the adjacent traffic intersections a2, c2, b1, and b3. To give an example, a vehicle heads toward the traffic intersection b2 from the traffic intersection a2 in the north direction at the instant that the traffic light switches to green at the traffic intersection a2. The vehicle arrives at the traffic intersection b2 with an arrival offset time, and stops when the traffic right in the north-south direction is red at the traffic intersection b2. A vehicle sensing signal is sent and, after a switching offset time elapses, the traffic light in the north-south direction is changed to green at the traffic intersection b2.

Figure 17:
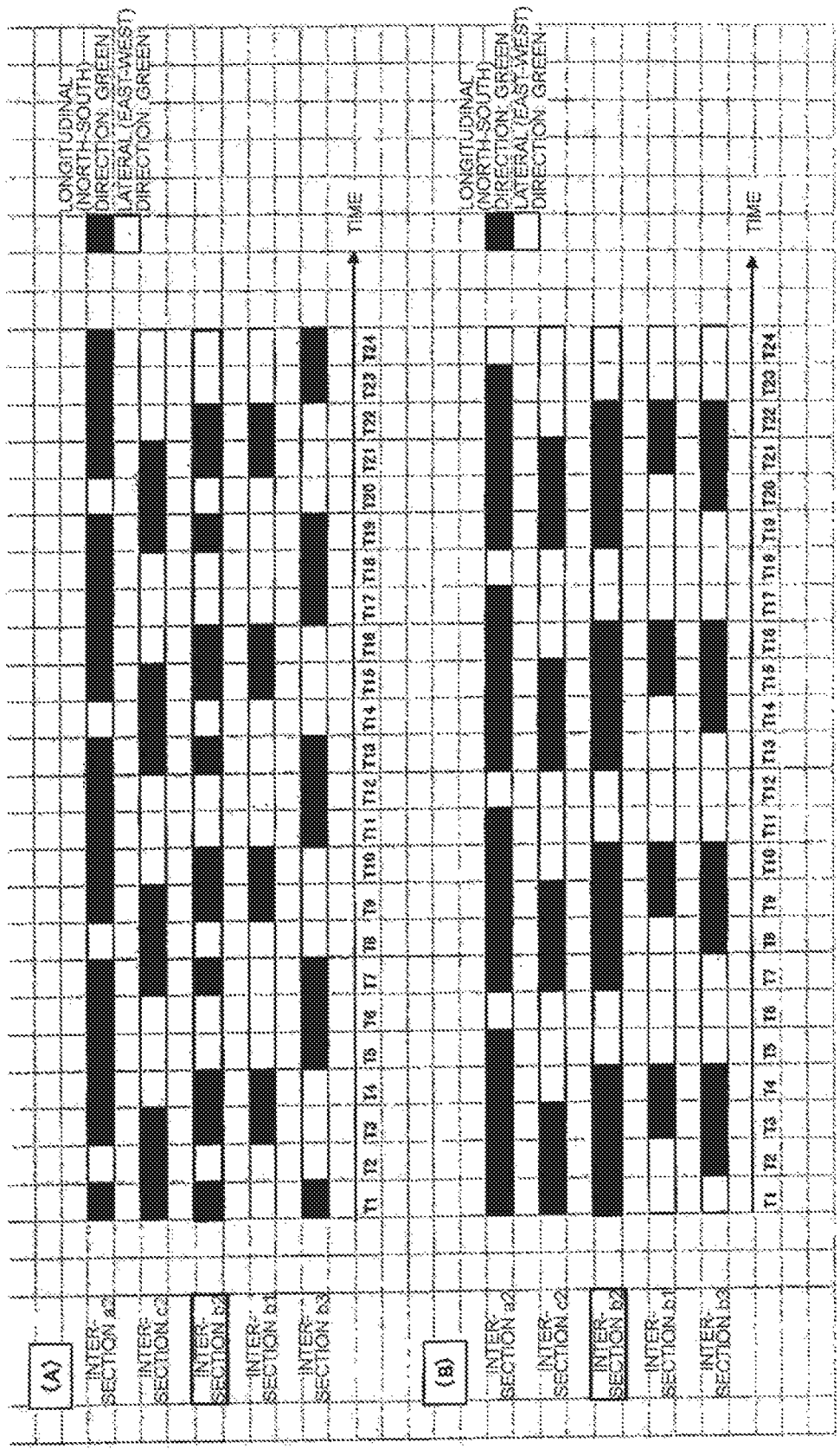
FIG. 17 is an example of traffic light timing in the third embodiment of this invention.

When the arrival offset time and the switching offset time are small enough to be negligible, the traffic light in the north-south direction changes to green at the traffic intersection b2 at timing dependent on the timing of switching the traffic light in the north-south direction to green at the traffic intersection a2 as indicated by (A) of FIG. 17. Similarly, the traffic light in the north-south direction changes to green at the traffic intersection b2 at the timing of switching the traffic light in the north-south direction to green at the traffic intersection c2. The traffic light in the east-west direction similarly changes to green at the traffic intersection b2 at the timing of switching the traffic light in the east-west direction to green at the traffic intersections b1 and b3.

The arrival offset time and the switching offset time are negligible in the description given above. The phenomenon is qualitatively the same even when the offset time cannot be ignored, because the arrival of a vehicle and a change of a traffic light may occur after the arrival offset time and the switching offset time elapse.

As illustrated in (A) of FIG. 17, the ratio of the lengths of time for which the traffic lights are lit in green at the traffic intersection b2 is not in proportion to the ratio of the vehicle flow rate in the north-south direction and the vehicle flow rate in the east-west direction at the traffic intersection b2, which is [2:1]. This is because the traffic lights at the traffic intersection b2 change at timing dependent on the light switching timing of the adjacent traffic intersections a2, c2, b1, and b3.

The WUβ's at the traffic intersections a2, c2, b1, and b3 are assumed to be capable of sharing their respective pieces of light switching timing information over the network 60. In this case, lighting timing of the traffic intersection b2 can be adjusted to [2:1] ((B) of FIG. 17), which is equal to the vehicle flow rates at the traffic intersection b2, by, for example, synchronizing the traffic intersections a2 and c2 in the timing of changing the traffic light in the north-south direction to green, synchronizing the traffic intersections b1 and b3 in the timing of changing the traffic light in the east-west direction to green, and appropriately staggering the timing of changing the traffic light in the north-south direction to green at the traffic intersections a2 and c2 and the timing of changing the traffic light in the east-west direction to green at the traffic intersections b1 and b3. In practice, information unique to each road or each pair of traffic intersections, such as the distance between the traffic intersections and a speed profile, is used to perform control. The control rule described above is laid on the premise that the vehicle flow rate is at a certain level. When the vehicle flow rate is lower than that level, it is sufficient that traffic lights at each traffic intersection operate under sensing-type control.

[Description of the Operation]

Figure 15:
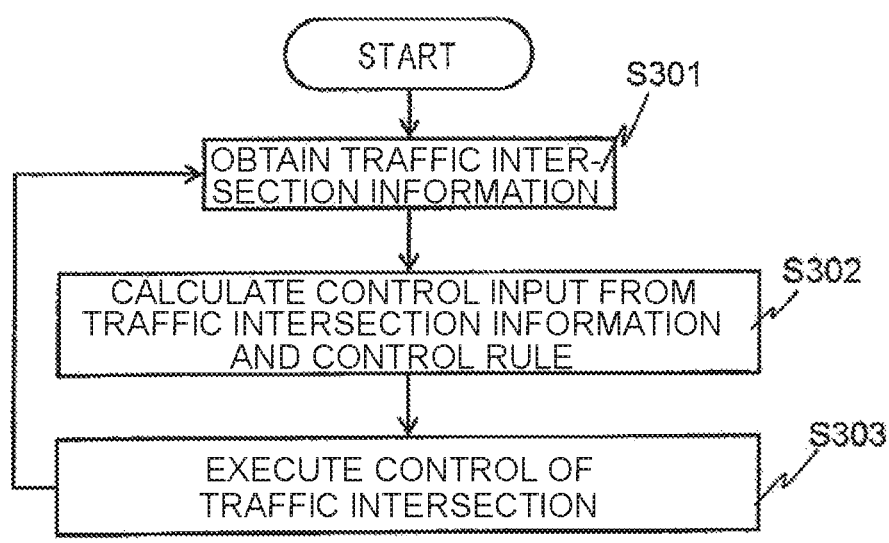
FIG. 15 is a flow chart for illustrating the operation of the WUα in the third embodiment of this invention.

FIG. 15 is a flow chart for illustrating the operation of each WUα in the third embodiment. In FIG. 15, the WUα starts the operation at one traffic intersection and first obtains traffic intersection information of its own traffic intersection with the use of the traffic intersection information obtaining unit 3-10-2 (Step S301). The traffic intersection information in the third embodiment is, for example, a vehicle sensing signal provided by a vehicle sensor and a time at which the vehicle sensing signal is obtained.

Next, the controller 3-10-1 calculates a control input from the traffic intersection information obtained from the traffic intersection information obtaining unit 3-10-2 and the control rule stored in advance in the storage (not shown) (Step S302). For example, the controller 3-10-1 checks the time of vehicle detection against the control rule to determine in what color the traffic light is to be lit at the current time. The control rule here dictates, for example, to wait for τ1 seconds after the detection of a vehicle, then change the traffic light on the side where the vehicle has been detected to green, change the traffic light from green to yellow at τ2 seconds past the change to green, and change the traffic light from yellow to red at τ3 seconds past the change. The WUα uses an internal time measurement device or the like to perform light switching timing control.

The controller 3-10-1 next controls the color of the traffic light at the traffic intersection based on the determined color of the traffic light (Step S303). For example, the controller 3-10-1 gives an instruction specifying a display color to a display device (not shown) of the traffic light.

Figure 16:
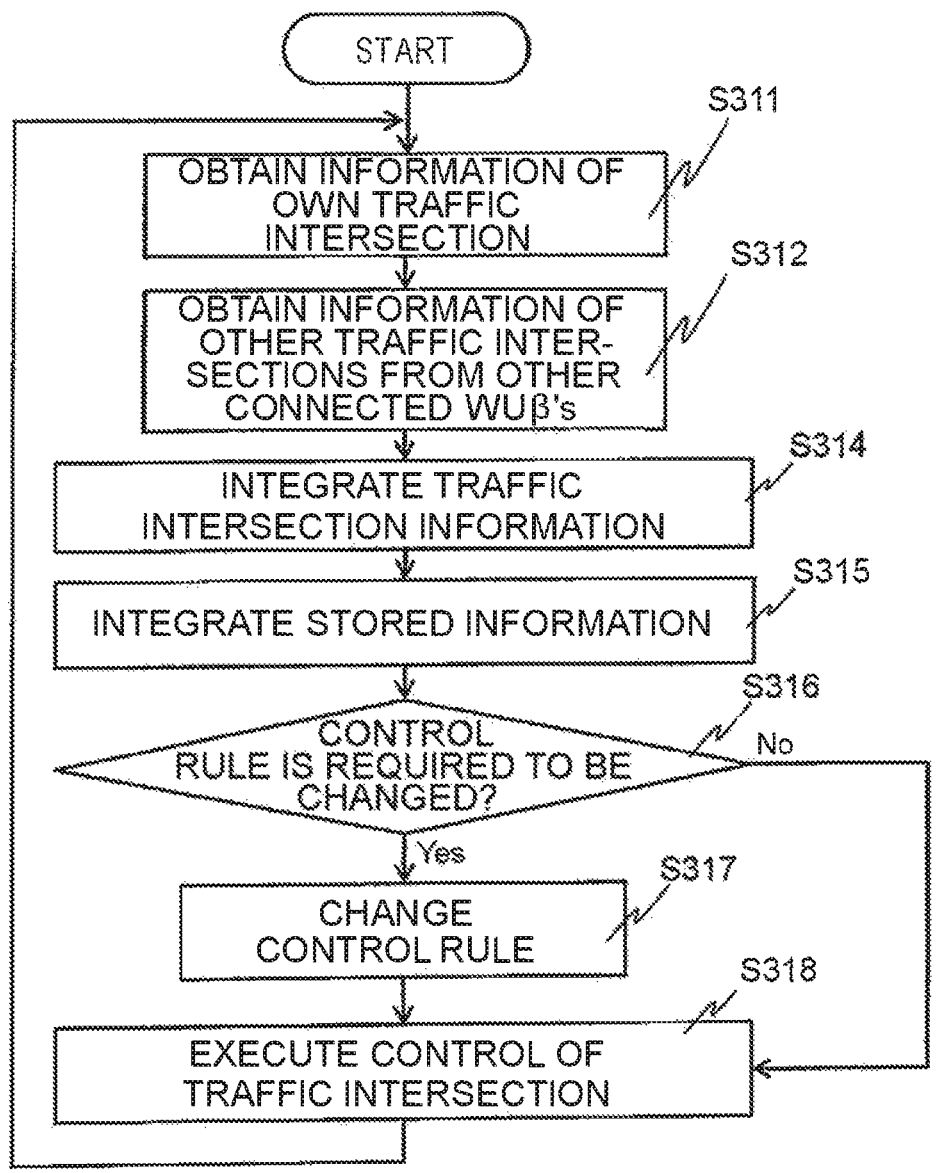
FIG. 16 is a flow chart for illustrating the operation of the WUβ in the third embodiment of this invention.

FIG. 16 is a flow chart for illustrating the operation of each WUβ in the third embodiment. It is known that a maximum flow rate at a traffic intersection is reached generally by allocating time so that the length of time for which a traffic light at the traffic intersection is lit in green is in proportion to the ratio of the vehicle flow rate in a longitudinal (e.g., north-south) direction and the vehicle flow rate in a lateral (e.g., east-west) direction. Accordingly, the control objective of the WUβ is, for example, to set timing that is in proportion to the vehicle flow rate in the north-south direction and the vehicle flow rate in the east-west direction as the timing of lighting (switching) traffic lights of its own traffic intersection, and to control the timing of lighting (switching) traffic lights of another WU, specifically, WUα, so that the lighting (switching) timing reflects as closely as possible the vehicle flow rate in the north-south direction and the vehicle flow rate in the east-west direction at the traffic intersection of the WUα.

In FIG. 16, the WUβ starts the operation and first obtains the traffic intersection information of its own traffic intersection through the operation of the traffic intersection information obtaining unit 3-11-2 (Step S311). The traffic intersection information here is, for example, the number of vehicles lined up in its own traffic intersection, and destination information about the destinations of the vehicles. The number of vehicles is detected by, for example, various weight sensors, ultrasonic sensors, and dielectric sensors. The destination information may be obtained by, for example, picking up an image of waiting vehicles with a camera, and figuring out, through image processing or the like, the number of vehicles in a left-turn-only lane, the number of vehicles in a right-turn-only lane, and whether a turn signal is lit.

Next, the traffic intersection information integrator 3-11-4 obtains traffic intersection information of other traffic intersections from a plurality of other WUβ's (Step S312). The traffic intersection information of other traffic intersections is, for example, lighting (switching) timing information about the immediate past timing of switching lights in the other traffic intersections, the numbers of vehicles lined up in the other traffic intersections, destination information about the destinations of the vehicles, and a statistical average flow rate of vehicles.

The traffic intersection information integrator 3-11-4 next integrates the traffic intersection information of its own traffic intersection and the traffic intersection information of other traffic intersections (Step S314). The "integration" means, for example, creating a consolidated piece of information by associating, for each traffic intersection, information that has been obtained at the traffic intersection with information that indicates the traffic intersection, such as the name of the traffic intersection.

In the third embodiment, flow rate information, for example, is obtained in this step for each traffic intersection about the flow rate of vehicles passing through the traffic intersection.

Next, the obtained information described above is integrated with unique information stored in the storage 3-11-5. The unique information stored in the storage 3-11-5 is the distance from its own traffic intersection to each adjacent traffic intersection, an average speed profile for a drive up to the adjacent traffic intersection, an average vehicle flow rate, and the like. The information obtained by the traffic intersection information integrator 3-11-4 may be stored in the storage 3-11-5 as the need arises. In this manner, the controller 3-11-1 integrates the obtained traffic intersection information of its own traffic intersection, the obtained traffic intersection information of other traffic intersections, and the stored information from the storage 3-11-5 (Step S315). To give a specific example, the controller 3-11-1 calculates, for each direction (the east, the west, the north, the south) at its own traffic intersection, an expected average flow rate of vehicles from flow rate information about flow rates at other traffic intersections that are adjacent to the own traffic intersection, and from various types of unique information such as the distance to another traffic intersection that is adjacent to the own traffic intersection, and a speed profile.

The controller 3-11-1 determines, from the information of surrounding WUβ's and the road information that have been obtained in preceding steps up through Step S315, whether it is required to change the lighting (switching) timing or the duration of a lighted state at its own traffic intersection (Step S316). For example, when it is found that the traffic intersections b1 and b3 have become out of sync with each other, the controller 3-11-1 determines that a change is required and changes the control rule to maintain synchronization (Step S317). The controller 3-11-1 controls its own traffic intersection under the current control rule irrespective of whether the current control rule has been changed from the preceding control rule or is unchanged from the preceding control rule (Step S318).

Effects of the Third Embodiment

According to the third embodiment, the configuration and operation described above require WUβ's of only some of traffic intersections to obtain information of the surroundings and form cooperation among their own traffic intersections in order to perform sophisticated control on WUα's of nearby traffic intersections at which simple control is performed.

A model in which the vehicle flow rate is approximated by, for example, a partial differential equation may be used to consider a vehicle flow as a fluid traveling along grids. In that case, a transfer function that is exerted by controlling a traffic light at a grid point (traffic intersection) on the surroundings of the grid point can be defined. When the range of influence of one WUβ is determined, a range in which a gain of the transfer function remains lower than a fixed value may be obtained to place the WUβ so that the gain of the transfer function does not exceed the obtained range. Cooperation among WUβ's in the surroundings may be used to perform gain control in which a local transfer function of the surroundings is monitored and, when a gain of the transfer function exceeds a certain standard, further amplification of the gain is prevented by controlling the interval of lighting (switching) traffic lights.

In the third embodiment, there is described an example of carrying out this invention in which the range of influence of one WUβ is obtained in a two-dimensional grid to arrange WUβ's at specific intervals in the system, to thereby indirectly control, through control exerted by some of WU's that are WUβ's, other WU's that are WUα's. It is understood that the discussions on the examples of application to a one-dimensional topology in the first embodiment and the second embodiment and the example of application to a two-dimensional topology in the third embodiment can be extended to N-dimensions as a general rule. This invention is accordingly applicable to a flow network that has an N-dimensional topology as well.

While descriptions have been given above of the embodiments of this invention with reference to the drawings, the concrete configuration of this invention is not limited to the ones described above, and various design modifications and the like can be made without departing from the spirit of this invention.

For instance, although flow control in a production facility, flow control in cell production, and flow control in a traffic network are taken as an example in the description of embodiments of this invention, this invention is not limited thereto. In a supply chain, for example, various nodes, namely, WU's, such as a production plant, a commodity distribution base, a wholesale warehouse, and a retail shop, each have a buffer to adjust the flow of products based on demands. The supply chain as a whole is a super multivariable, and it is not possible for each retail shop or each wholesale warehouse to gather all pieces of information. With the flow control system according to this invention, however, a control rule dictating at which speed products are to be sent down to a retail shop is adjusted based on local information only at specific control bases that correspond to WUβ's, for example, specific wholesale warehouses and commodity distribution bases, to thereby be able to spread an influence of the control to wholesale warehouses and retail shops that correspond to WUα's and that are not directly controlled, and improve the overall efficiency. Similarly, this invention may be applied to picking up in the commodity distribution industry and flow control in delivering packages. This invention is applicable to various areas such as supply chain management that includes warehousing work at a warehouse, an assembly process in a plant, cargo loading/unloading at a dock, and receiving and dispatching of trucks.

Some or all of the embodiments described above can also be described by the following supplementary notes, but are not limited to the following descriptions.

(Supplementary Note 1)

A flow control system, comprising:

a plurality of work units α (hereinafter abbreviated as WUα's); and a plurality of work units β (hereinafter abbreviated as WUβ's), the plurality of WUβ's and the plurality of WUα's being linked, wherein each of the plurality of WUα's has an α control objective, which is a control objective set for each WU independently, and an α control rule, which is a control rule to be applied to the α control objective, wherein each of the plurality of WUβ's has a β control objective, which is an aim to enable many WUα's out of the plurality of WUα's to achieve their respective α control objectives, and a β control rule, which is a control rule to be applied to the β control objective, wherein the β control rule is a control rule dynamically changed based on partial information of the flow control system, and wherein the plurality of WUβ's are placed in some areas of the flow control system.

(Supplementary Note 2)

The flow control system according to Supplementary Note 1, in which each of the plurality of WUα's handles a processing step, which is a control target, wherein the processing step involves at least a buffer and processing adjustable in speed, and wherein the WUα includes:

a step information obtaining unit configured to obtain processing step information from the processing step of the own WUα; and a controller configured to control the processing step based on the obtained processing step information of the own WUα.

(Supplementary Note 3)

The flow control system according to Supplementary Note 1 or 2, in which each of the plurality of WUβ's handles a processing step, which is a control target, wherein the processing step involves at least a buffer and processing adjustable in speed, and wherein the WUβ includes:

a step information obtaining unit configured to obtain processing step information of the own WUβ from the processing step of the own WUβ;

a step information integrator configured to obtain peripheral processing step information from other work units, WUα's or WUβ's, that are near the WUβ, and integrate the obtained peripheral processing step information and the obtained processing step information of the own WUβ; and a controller configured to control the processing step based on the integrated processing step information.

(Supplementary Note 4)

The flow control system according to Supplementary Note 3, in which the WUβ is capable of sharing, with some of or all of the plurality of WUβ's, part of or all of the obtained peripheral processing step information, or secondary information obtained by processing the obtained peripheral processing step information, and wherein the controller in each of the plurality of WUβ's executes control based on the shared processing step information or the shared secondary information.

(Supplementary Note 5)

The flow control system according to any one of Supplementary Notes 1 to 4, in which placement of the plurality of WUβ's is determined in advance from a range of influence exerted on the flow control system by each individual WUβ through control performed under the β control rule.

(Supplementary Note 6)

The flow control system according to any one of Supplementary Notes 1 to 4, in which, when placement of the plurality of WUβ's is given in advance as a constraint condition, the β control rule is determined so that a range of influence exerted by the β control rule on the flow control system cover the entire system.

(Supplementary Note 7)

The flow control system according to any one of Supplementary Notes 1 to 6, in which the range of influence of the β control rule is determined by expressing the flow control system by a mathematical model, and analytically determining the range of influence of control that is performed under the β control rule.

(Supplementary Note 8)

The flow control system according to any one of Supplementary Notes 1 to 6, in which, when a control input of a specific magnitude is input to a specific WUβ that is one of the plurality of WUβ's, responses of the WUα's that are linked to the WUβ to which the control input is input are measured, and the range of influence of the β control rule is determined by the number of WUα's whose responses are short of a given standard, the number of the WUα's being counted from the specific WUβ.

(Supplementary Note 9)

The flow control system according to any one of Supplementary Notes 1 to 8, in which each of the plurality of WUβ's is implemented by adding a device that is required in any WUβ to one of the plurality of WUα's.

(Supplementary Note 10)

The flow control system according to any one of Supplementary Notes 1 to 9, in which the placement of the plurality of WUβ's may dynamically be changed.

(Supplementary Note 11)

The flow control system according to any one of Supplementary Notes 1 to 10, in which the flow control system is a system in which the plurality of WUα's and the plurality of WUβ's are N-dimensionally linked.

(Supplementary Note 12)

The flow control system according to Supplementary Note 11, in which the plurality of WUα's and the plurality of WUβ's are linked one-dimensionally or two-dimensionally, and wherein a specific WUα or WUβ that is one of the plurality of WUα's or one of the plurality of WUβ's is affected by processing of one of the plurality of WUα's or one of the plurality of WUβ's that is adjacent to the specific WUα or WUβ.

(Supplementary Note 13)

The flow control system according to any one of Supplementary Notes 1 to 12, in which the α control objective is an aim to, when a state space is considered with respect to the processing step of the own WUα, keep the state of the own WUα in a specific range inside the state space.

(Supplementary Note 14)

The flow control system according to any one of Supplementary Notes 1 to 13, in which the β control objective is an aim to, when a state space is considered with respect to the entire system, keep the state of the entire system in a specific range inside the state space.

(Supplementary Note 15)

The flow control system according to any one of Supplementary Notes 1 to 14, in which the range of influence of the β control rule is determined by expressing the system by a state space model, and determining the range of influence of control that is performed under the β control rule from a change in the state space that is caused by the control.

(Supplementary Note 16)

The flow control system according to any one of Supplementary Notes 1 to 14, in which the range of influence of the β control rule is determined by expressing the system by a Petri net model, and determining the range of influence of control that is performed under the β control rule from a set of markings reachable on a Petri net by the control.

(Supplementary Note 17)

The flow control system according to any one of Supplementary Notes 1 to 16, in which, when the system is in an equilibrium state and a control input of a specific magnitude is input to a specific WUβ that is one of the plurality of WUβ's, the WUα's that are linked to the specific WUβ to which the control input is input each experience displacement from an equilibrium point of a control target of the WUα, and the range of influence of the β control rule is determined by the number of the linked WU's in which a maximum value of the displacement attenuates to a predetermined threshold value or lower, the number of the linked WU's being counted from the specific WUβ.

(Supplementary Note 18)

The flow control system according to any one of Supplementary Notes 1 to 17, in which the plurality of WUα's and the plurality of WUβ's are production management control units.

(Supplementary Note 19)

The flow control system according to any one of Supplementary Notes 1 to 17, in which the plurality of WUα's and the plurality of WUβ's are cell production control units.

(Supplementary Note 20)

The flow control system according to any one of Supplementary Notes 1 to 17, in which the plurality of WUα's and the plurality of WUβ's are traffic light control units.

(Supplementary Note 21)

The flow control system according to any one of Supplementary Notes 1 to 20, in which the plurality of WUβ's may each have the α control rule and the α control objective.

(Supplementary Note 22)

A control method for a flow control system, comprising a plurality of work units α (hereinafter abbreviated as WUα's); and a plurality of work units β (hereinafter abbreviated as WUβ's), the plurality of WUβ's and the plurality of WUα's being linked, wherein each of the plurality of WUα's has an α control objective, which is a control objective set for each WU independently, and an α control rule, which is a control rule to be applied to the α control objective, wherein each of the plurality of WUβ's has a β control objective, which is an aim to enable many WUα's out of the plurality of WUα's to achieve their respective α control objectives, and a β control rule, which is a control rule to be applied to the β control objective, wherein the β control rule is a control rule dynamically changed based on partial information of the flow control system, and wherein the plurality of WUβ's are placed in some areas of the flow control system, wherein each of the plurality of WUα's at least handles a processing step, which is a control target, wherein the processing step involves at least a buffer and processing adjustable in speed, and wherein the WU is operable:

to obtain processing step information from the processing step of the own WUα; and to control the processing step based on the obtained processing step information of the own WUα.

wherein each of the plurality of WUβ's at least handles a processing step, which is a control target, wherein the processing step involves at least a buffer and processing adjustable in speed, and wherein the WUβ is operable:

to obtain processing step information of the own WUβ from the processing step of the own WUβ;

to obtain peripheral processing step information from other work units, WUα's or WUβ's, that are near the WUβ, and integrate the obtained peripheral processing step information and the obtained processing step information of the own WUβ; and to control the processing step based on the integrated processing step information.

(Supplementary Note 23)

The control method according to Supplementary Note 22, including causing each of the plurality of WUβ's to:

determine, after integrating the obtained peripheral processing step information and the obtained processing step information of the own WUβ, whether the β control rule is required to be changed, based on the integrated processing step information; and change the β control rule when it is determined that the β control rule is required to be changed, and then execute control of the processing step.

INDUSTRIAL APPLICABILITY

This invention is applicable to flow control systems in general, including a flow control system in which a plurality of autonomous systems are linked and an autonomous decentralized flow control system that controls the overall efficiency of a system.

REFERENCE SIGNS LIST 1a, 1b information obtaining device
2a, 2b buffer
3a, 3b processing equipment
10a to 10f WUα
11a to 11b WUβ
30, 60 network
10-1, 11-1, 10-51, 11-51 controller
10-2, 11-2, 10-52 step information obtaining unit
10-3, 11-3, 10-53 processing step
11-4, 11-52 step information integrator
100 work line
200 flow control system
10-5 WUα component
11-5 WUβ module
11-52 interface
a, b, c, 01, 02, 03 arterial road
a1, a2, a3, b1, b2, b3, c1, c2, c3 traffic intersection
301 to 305 vehicle
3-10 WUα
3-10-1, 3-11-1 controller 3-10-2, 3-11-2 traffic intersection information obtaining unit
3-10-3, 3-11-3 traffic intersection
3-11a to 3-11c WUβ
3-11-4 traffic intersection information integrator
3-11-5 storage

What is claimed is:

1. A flow control system, comprising:
   a plurality of work units α (hereinafter abbreviated as WUα's); and
   a plurality of work units β (hereinafter abbreviated as WUβ's), the plurality of WUβ's and the plurality of WUα's being linked,
   wherein each of the plurality of WUα's has an α control objective, which is a first control objective set for each WU independently, and an α control rule, which is a first control rule to be applied to the α control objective,
   each of the plurality of WUβ's has a β control objective, which is an aim to enable many WUα's out of the plurality of WUα's to achieve their respective α control objectives, and a β control rule, which is a second control rule to be applied to the β control objective,
   the β control rule is the second control rule dynamically changed based on partial information of the flow control system,
   the plurality of WUβ's are placed in some areas of the flow control system,
   wherein each of the plurality of WUα's handles a first processing step, which is a first control target,
   wherein the WUα is configured to:
     obtain first processing step information from the first processing step of the WUα; and
     control the first processing step based on the obtained first processing step information of the WUα,
   wherein each of the plurality of WUβ's handles a second processing step, which is a second control target,
   wherein the WUβ is configured to:
     obtain second processing step information of the WUβ from the second processing step of the WUβ;
     obtain peripheral processing step information from other work units, WUα's or WUβ's, that are near the WUβ, and integrate the obtained peripheral processing step information and the obtained second processing step information of the WUβ; and
   control the second processing step based on the integrated processing step information.

2. The flow control system according to claim 1,
   wherein the first processing step involves at least a first buffer and first processing adjustable in speed.

3. The flow control system according to claim 1,
   wherein the second processing step involves at least a second buffer and second processing adjustable in speed.

4. The flow control system according to claim 1,
   wherein the WUβ is capable of sharing, with some of or all of the plurality of WUβ's, part of or all of the obtained peripheral processing step information, or secondary information obtained by processing the obtained peripheral processing step information, and
   wherein each of the plurality of WUβ's executes control based on the shared processing step information or the shared secondary information.

5. The flow control system according to claim 1, wherein placement of the plurality of WUβ's is determined in advance from a range of influence exerted on the flow control system by each individual WUβ through control performed under the β control rule.

6. The flow control system according to claim 1, wherein, when placement of the plurality of WUβ's is given in advance as a constraint condition, the β control rule is determined so that a range of influence exerted by the β control rule on the flow control system covers the entire system.

7. The flow control system according to claim 1, wherein a range of influence of the β control rule is determined by expressing the flow control system by a mathematical model, and analytically determining the range of influence of control that is performed under the β control rule.

8. The flow control system according to claim 1, wherein, when a control input of a specific magnitude is input to a specific WUβ that is one of the plurality of WUβ's, responses of the WUα's that are linked to the WUβ to which the control input is input are measured, and a range of influence of the β control rule is determined by the number of WUα's whose responses are short of a given standard, the number of the WUα's being counted from the specific WUβ.

9. The flow control system according to claim 1,
   wherein the plurality of WUα's and the plurality of WUβ's are linked one-dimensionally or two-dimensionally, and
   wherein a specific WUα or WUβ that is one of the plurality of WUα's or one of the plurality of WUβ's is affected by processing of one of the plurality of WUα's or one of the plurality of WUβ's that is adjacent to the specific WUα or WUβ.

10. The flow control system according to claim 1, in which each of the plurality of WUβ's is implemented by adding a device that is required in any WUβ to one of the plurality of WUα's.

11. The flow control system according to claim 1, in which placement of the plurality of WUβ's may dynamically be changed.

12. The flow control system according to claim 1, in which the flow control system is a system in which the plurality of WUα's and the plurality of WUβ's are N-dimensionally linked.

13. The flow control system according to claim 1, in which the α control objective is an aim to, when a first state space is considered with respect to the first processing step of the WUα, keep a state of the WUα in a specific range inside the first state space.

14. The flow control system according to claim 1, in which the β control objective is an aim to, when a second state space is considered with respect to the entire system, keep the state of the entire system in a specific range inside the second state space.

15. The flow control system according to claim 1, in which a range of influence of the β control rule is determined by expressing the system by a state space model, and determining the range of influence of control that is performed under the β control rule from a change in a state space that is caused by the control.

16. The flow control system according to claim 1, in which a range of influence of the β control rule is determined by expressing the system by a Petri net model, and determining the range of influence of control that is performed under the β control rule from a set of markings reachable on a Petri net by the control.

17. The flow control system according to claim 1, in which, when the system is in an equilibrium state and a control input of a specific magnitude is input to a specific WUβ that is one of the plurality of WUβ's, the WUα's that are linked to the specific WUβ to which the control input is input each experience displacement from an equilibrium point of a control target of the WUα, and a range of influence of the β control rule is determined by the number of the linked WU's in which a maximum value of the displacement attenuates to a predetermined threshold value or lower, the number of the linked WU's being counted from the specific WUβ.

18. The flow control system according to claim 1, in which the plurality of WUα's and the plurality of WUβ's are production management control units.

* * * * *